United States Patent [19]
Sapia et al.

[11] Patent Number: 6,166,853
[45] Date of Patent: *Dec. 26, 2000

[54] METHOD AND APPARATUS FOR THREE-DIMENSIONAL DECONVOLUTION OF OPTICAL MICROSCOPE IMAGES

[75] Inventors: Mark A. Sapia, Canton; James C. Schaff, Cheshire; Ian R. Greenshields, Mansfield Center; Leslie M. Loew; Frank R. Morgan, both of W. Hartford, all of Conn.

[73] Assignee: The University of Connecticut, Storrs, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,785

[22] Filed: Jan. 9, 1997

[51] Int. Cl.[7] .............................. G02B 27/46; G06K 9/76; G06K 9/40
[52] U.S. Cl. .................. 359/559; 382/260; 382/263; 382/210; 382/254; 382/255
[58] Field of Search .................................... 359/559, 563; 364/604, 724; 367/46; 235/152; 382/270–272, 260–265; 333/18

[56] References Cited

U.S. PATENT DOCUMENTS

| | | |
|---|---|---|
| 4,038,536 | 7/1977 | Feintuch .................................. 235/152 |
| 4,063,549 | 12/1977 | Beretsky et al. . |
| 4,325,257 | 4/1982 | Kino et al. . |
| 4,612,575 | 9/1986 | Ishman et al. . |
| 4,947,323 | 8/1990 | Smith . |
| 4,947,362 | 8/1990 | Bui . |
| 5,173,879 | 12/1992 | Cung et al. . |
| 5,300,771 | 4/1994 | Labowsky . |
| 5,340,988 | 8/1994 | Kingsley et al. . |
| 5,400,299 | 3/1995 | Trantham . |
| 5,414,782 | 5/1995 | Carasso . |
| 5,440,119 | 8/1995 | Labowsky . |
| 5,504,523 | 4/1996 | Wight et al. . |
| 5,513,531 | 5/1996 | Sapia et al. . |
| 5,563,962 | 10/1996 | Peters et al. . |

*Primary Examiner*—Audrey Chang
*Attorney, Agent, or Firm*—Cantor Colburn LLP

[57] ABSTRACT

An adaptive structure of a Wiener filter is used to deconvolve three-dimensional wide-field microscope images for the purposes of improving spatial resolution and removing out-of-focus light. The filter is a three-dimensional kernel representing a finite-impulse-response (FIR) structure requiring on the order of one thousand (1000) taps or more to achieve an acceptable mean-square-error. Converging to a solution is done in the spatial-domain and therefore does not experience many of the problems of frequency-domain solutions. Alternatively, a three-dimensional kernel representing an infinite-impulse-response (IIR) structure may be employed. An IIR structure typically requires fewer taps to achieve the same or better performance, resulting in higher resolution images with less noise and faster computations.

14 Claims, 19 Drawing Sheets

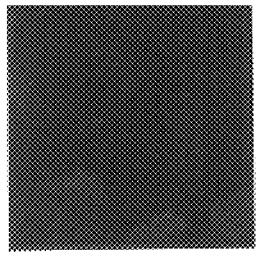 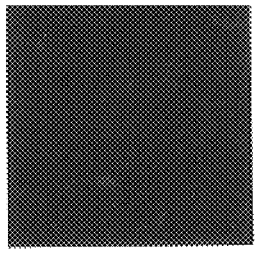 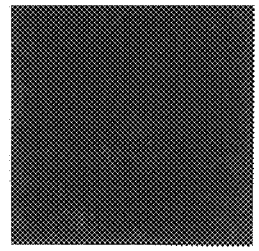 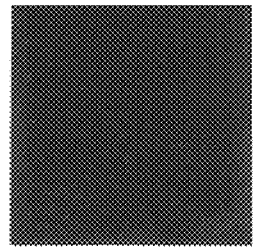
FIG. 7A  FIG. 7B  FIG. 7C  FIG. 7D
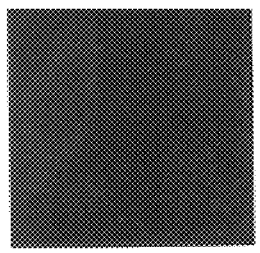 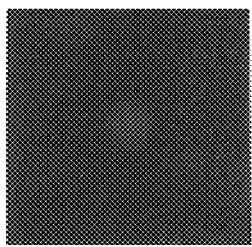 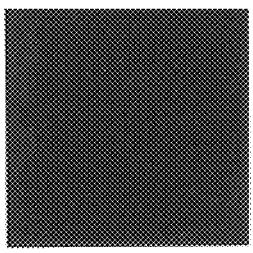 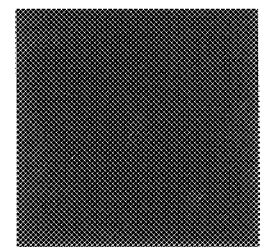
FIG. 7E  FIG. 7F  FIG. 7G  FIG. 7H
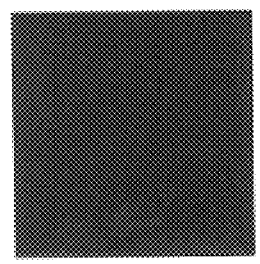 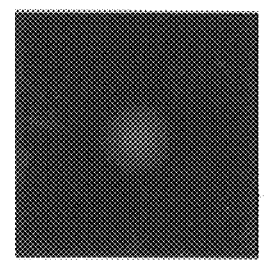 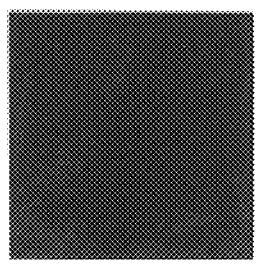 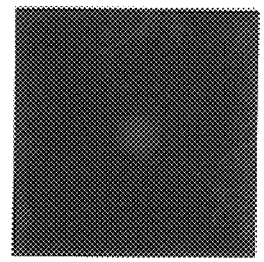
FIG. 7I  FIG. 7J  FIG. 7K  FIG. 7L
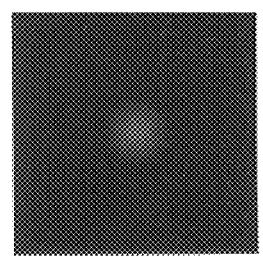 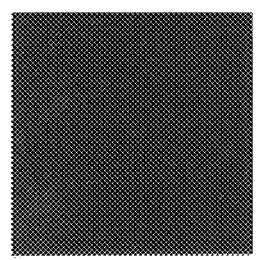 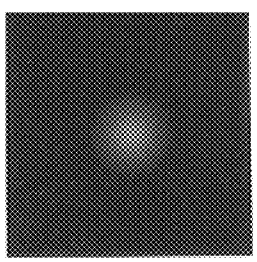 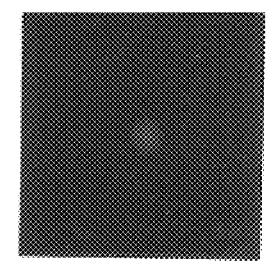
FIG. 7M  FIG. 7N  FIG. 7O  FIG. 7P

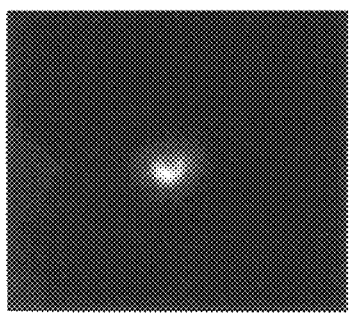
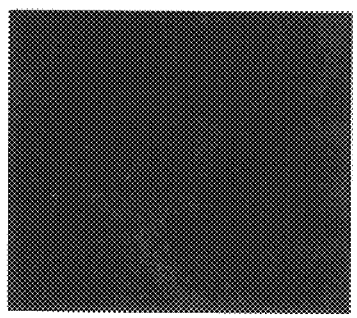
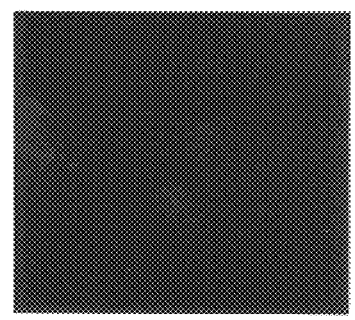
FIG. 9A    FIG. 9B    FIG. 9C
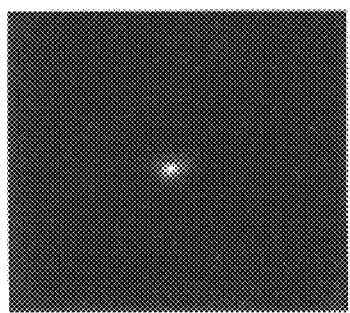
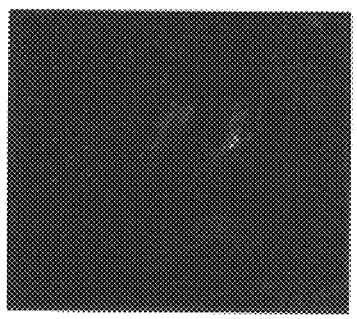
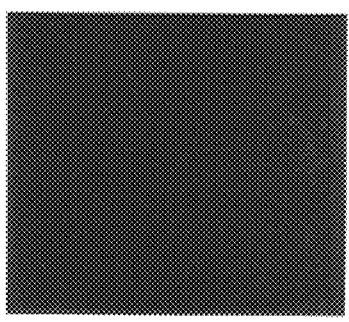
FIG. 9D    FIG. 9E    FIG. 9F
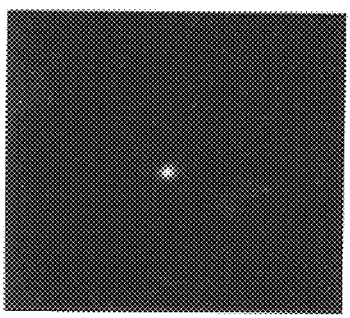
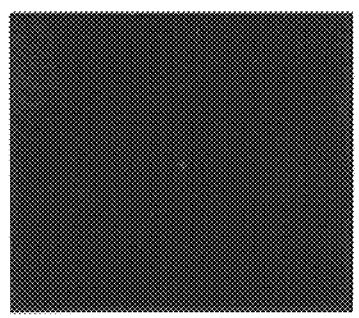
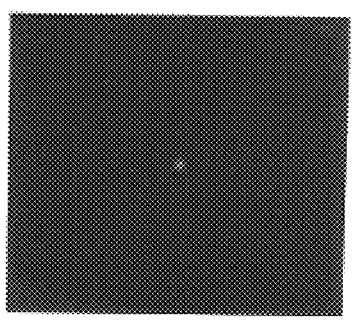
FIG. 9G    FIG. 9H    FIG. 9I

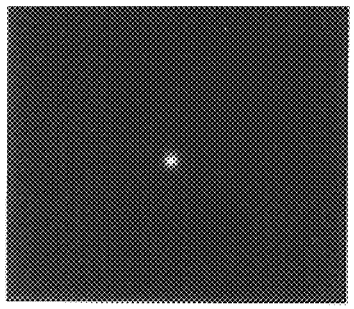
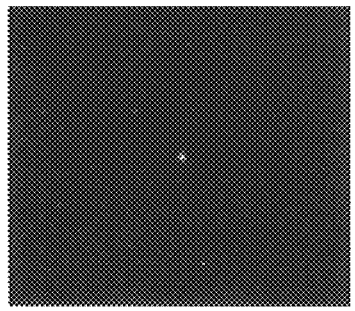
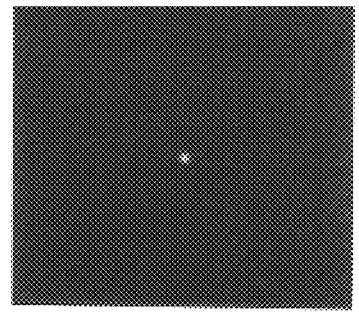
FIG. 9J     FIG. 9K     FIG. 9L
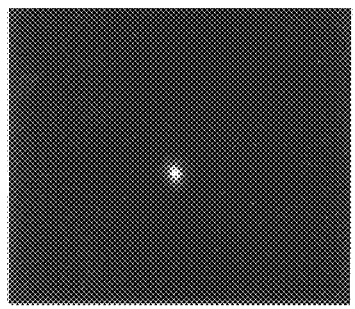
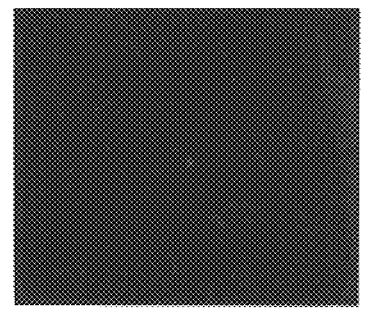
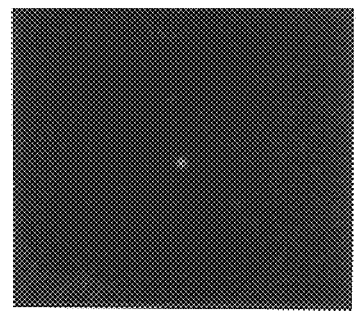
FIG. 9M     FIG. 9N     FIG. 9O
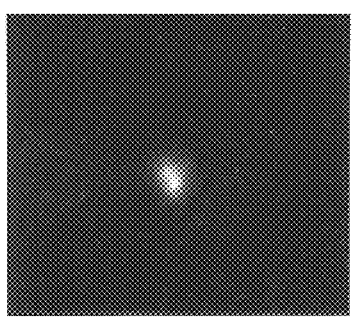
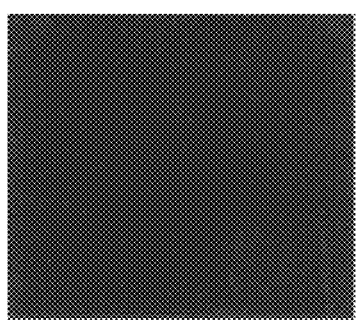
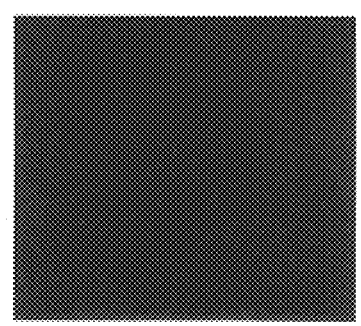
FIG. 9P     FIG. 9Q     FIG. 9R

METHOD AND APPARATUS FOR THREE-DIMENSIONAL DECONVOLUTION OF OPTICAL MICROSCOPE IMAGES

BACKGROUND OF THE INVENTION

The present invention relates generally to the field of microscopy. More specifically, the present invention relates to a method and apparatus for three-dimensional deconvolution of optical microscope images.

It is known in light microscopy to use fluorescent dyes to study the spatial distribution of specific cellular elements. The use of fluorescent dyes allows examination of cellular elements that would not otherwise be discernible with conventional light microscopy. With the use of some very specialized dyes, specific cellular elements can be tagged for imaging, e.g., Hoechst 33258 is a dye for labeling DNA, see, Agard, D. A., Hiraoka, Y., Shaw, P., Sedat, J. W., Methods in Cell Biology—Volume 30, Chapter 13 "Fluorescence Microscopy in Three Dimensions," San Diego, Calif., Academic Press, pp. 353–377, 1989. A class of reversible cationic redistribution dyes, tetramethylrhodamine ethyl (TMRE) and methyl esters (TMRM) are also used. These dyes are used for the study of mitochondria since the dyes produce intensities proportional to membrane potentials, see, Loew, L. M., Tuft, R. A., Carrington, W., Fay, F. S., "Imaging in Five Dimensions: Time-Dependent Membrane Potentials in Individual Mitochondria," Biophysical Journal, Volume 65, pp. 2396–2407, December, 1993.

Three-dimensional imaging of a fluorescently dyed substrate is performed by collecting a series of x-y images along the an optical z-axis. The data is recorded by charge-coupled-device (CCD) arrays. The CCD array is a two-dimensional arrangement of CCD elements that collects an image or an image slice in the x-y plane. The optical focus of the system is moved to an adjacent plane where the next image slice in the x-y plane is acquired. This is continued until the desired number of planes (image slices) have been acquired for the three-dimensional data set.

Two types of microscope systems are typically used for image acquisition: a three-dimensional wide-field microscope and a scanning confocal microscope. Both of these microscope systems are considered to be diffraction-limited. Diffraction theory describes the effects of light passing through a finite aperture to an image plane. The resulting image displays the effects of the wave nature of light. The end result is that light emanates from a point as a spherical wave front and scatters through a finite aperture. Various treatments of diffraction theory have been presented, e.g., see Goodman, J. W., Introduction to Fourier Optics, New York, McGraw-Hill, pp. 101–136, 1988. The most commonly accepted treatments of diffraction theory are Fresnel approximations for near field (i.e., Fresnel diffraction) and Fraunhofer approximations for far field (i.e., Fraunhofer diffraction). In either case, the resulting image due to a diffraction-limited system can be described by the product of the Fourier transforms of a source image and aperture distribution. In other words, the resulting image is a result of a convolution of the source object's light with an aperture of the imaging system. Further, the system transfer-function is obtained directly by taking the Fourier transform of the aperture. It will be appreciated that the blurring effects due to convolution exist in two-dimensions only, i.e., the x-y planes. The point-spread-function (PSF) is the expression used to describe the convolutional blurring in two-dimensions. The PSF physically results from imaging a point source. The Fourier transform of the PSF is the system transfer-function, which is obtained by convolving the system transfer-function with a Dirac-delta function. A point source is the physical equivalent of a Dirac-delta function, and, in the frequency domain, the Dirac-delta function is a unity operator across the spectrum. Therefore, the Fourier transform of the PSF should be the Fourier transform of the aperture. However, the PSF contains noise and blurring due to other effects such as aberrations.

Achieving high resolution imaging requires the use of a high numerical aperture lens (on the order of N.A.=1.2 to 1.4 or greater). This is one of the basic problems with three-dimensional wide-field microscopy. A high numerical aperture lens, although needed to obtain high spatial resolution with adequate sensitivity, causes the undesirable effect of corrupting the data with out-of-focus light. The very large cone angle associated with a high N.A. lens results in a very limited depth-of-focus (e.g., possibly 0.4 $\mu$m or less), see, Agard, D. A., Hiraoka, Y., Shaw, P., Sedat, J. W., Methods in Cell Biology—Volume 30, Chapter 13 "Fluorescence Microscopy in Three Dimensions," San Diego, Calif., Academic Press, pp. 353–377, 1989. Consequently, such images are plagued with out-of-focus light from planes above and below the plane being imaged, resulting in reduced resolution and sensitivity of the three-dimensional wide-field data sets.

Of the aforementioned six types of aberrations (i.e., the five Seidel aberrations and the chromaticaberration), spherical aberrations are the most significant. Spherical aberrations have little effect in two-dimensional imaging but are very prevalent in three-dimensional imaging. This is due to the fact that objective lenses are designed to image at a specific plane, usually the immediate underside of the coverslip. Therefore, the other planes that are imaged show significant blurriness from spherical aberrations.

Another major contribution to blurriness is the point-spread-function (PSF). This is the actual subject of deconvolution, it is the only contributor to blurriness that is a result of a convolution. As discussed hereinbefore, PSF occurs as a separate process in each of the two-dimensional planes. The combination of these three different effects plus noise contributes to the overall blurriness in a three-dimensional data set. The filter, although called a deconvolution filter, is actually designed to filter out the effects of out-of-focus light, aberrations, PSF and noise all at the same time. The term deconvolution is somewhat of a misnomer since only the PSF blurriness requires deconvolving.

The imaging process is greatly improved by using a scanning confocal microscope, wherein a laser is illuminated through a pinhole focused on a point in an object. The point is, in turn, focused through a pinhole to a detector. The term confocal describes the fact that the illumination and detection are commonly focused to the same point in an object. The object is scanned in three-dimensions to generate the three-dimensional data set. The same lens may be used to achieve confocal conditions.

Methods for improving the resolution of the scanning confocal microscope over what can be achieved with conventional microscopy are known. By way of example, assuming a circular aperture, the intensity distribution of the main lobe is reduced in width by a factor of 1.389 compared to conventional microscopy, see, Agard, D. A., Hiraoka, Y., Shaw, P., Sedat, J. W., Methods in Cell Biology—Volume 30, Chapter 13 "Fluorescence Microscopy in Three Dimensions," San Diego, Calif., Academic Press, pp. 353–377, 1989. In three-dimensions, this translates to $(1.389)^3$ or an improvement of 2.64 in the voxel intensity distribution. This improvement in resolution directly relates to the amount of information that can be recorded in the data set. Also, the sidelobe intensity of the scanning confocal microscope is reduced from approximately 1% in conventional microscopy to 0.01% in confocal microscopy, again see, , Agard, D. A., Hiraoka, Y., Shaw, P., Sedat, J. W., Methods in Cell Biology—Volume 30, Chapter 13 "Fluorescence Microscopy in Three Dimensions," San Diego, Calif., Academic Press, pp. 353–377, 1989. This greatly reduces the convolution effects thus essentially eliminating scattering. As a result, the dynamic range of intensity is increased two orders of magnitude, from 100:1 in conventional microscopy to 10,000:1 in a confocal system.

In fluorescence microscopy the point resolution is broadened due to the increased wavelength of the fluorescent light compared to the shorter wavelength of the laser illumination light. Accordingly, resolution of the confocal microscope is somewhat reduced as a result of fluorescence, but this is also a problem with conventional fluorescence microscopy as well.

While, the illumination pinhole in a confocal microscope can be small enough so that the illumination is essentially a point source, the detection pinholes must typically be larger to collect enough light from weakly fluorescing objects. Consequently, the advantages gained in reducing convolution effects are somewhat diminished since the detected light is a result of the convolution with the pinhole aperture.

Image acquisition with the confocal microscope must be carried out on a point by point basis, either by scanning a stationary specimen or by moving the specimen with respect to the confocal pinholes. In any case, image acquisition is presently a relatively slow process.

Confocal microscopes suffer from photobleaching and phototoxicity. This occurs due to the high intensity laser light being focused on a point in the specimen. The fluorescent dyes contribute to produce toxic oxygen radicals within the cell. As is well known, photobleaching can be minimized with the use of antioxidants, however, this is chemically intrusive, thereby limiting the study of cell processes.

In light of the foregoing, when attempting to image dynamic cell processes, a three-dimensional wide-field microscope employing digital signal processing techniques is often preferred. Nevertheless, it is otherwise preferred to acquire high resolution images without the need for employing digital signal processing techniques using confocal microscopes.

Microscopy systems are used to acquire images with sub-micron resolution. In general, optical microscopy is limited in resolution by the wavelength of light ($\lambda$) and the numerical aperture of the lens (N.A.=$\eta$ sin $\alpha$), whereby the minimum resolvable distance between distinct points can be expressed as:

$$d_{min} \approx \frac{\lambda}{\eta \sin \alpha} \quad (1)$$

where $\eta$ is the index of refraction and $\alpha$ is a lens cone ½ angle, see Gray, P., Slayter, E. M., The Encyclopedia of Microscopy and Microtechnique, New York, Van Nostrand Reinhold, pp. 382–389, 1973, which is incorporated herein by reference. This limitation is due to lens aberrations causing out of focus blur and the effects of the convolution of an image with an aperture of a system. The convolution effects are limited to two-dimensions only. Therefore, the blurriness associated with a three-dimensional data set is due to convolution effects in two-dimensions (i.e., x-y image planes) and aberrations in three-dimensions. By way of example, for a circular aperture, the convolution of a point is the Airy disc pattern (i.e., a function of $J_1$ which is a Bessel function of the first kind, first order). As is readily apparent, a further analysis leads to the Rayleigh resolution criteria which defines the minimum resolvable distance between two points as the separation of the peak intensities where the peak intensity of the first point corresponds with the first minimum of the second point, assuming a circular aperture. See, for example: Cherry, R. J., New Techniques of Optical Microscopy and Microspectroscopy, Boca Raton, Fla., CRC Press (Macmillan Press), pp. 31–43, 1991: Goodman, J. W., Introduction to Fourier Optics, New York, McGraw-Hill, pp. 101–136, 1988; and Gray, P., Slayter, E. M., The Encyclopedia of Microscopy and Microtechnique, New York, Van Nostrand Reinhold, pp. 382–389, 1973. The Rayleigh resolution criteria can be expressed as:

$$\text{Rayleigh } d_{min} = \frac{1.22 \lambda}{2 \, N.A.} \quad (2)$$

or, expressed in terms of the highest spatial frequency, $f_p$, as:

$$\text{Rayleigh } d_{min} = 1.22/f_p \quad (3)$$

where $f_p$ is defined as:

$$f_p = 2\eta \sin \alpha / \lambda \quad (4).$$

It will be appreciated that the Rayleigh resolution criteria only addresses the convolution effects and is a two-dimensional phenomenon. However, aberrations affect the image quality in three-dimensions. The five types of aberrations in monochromatic systems (see, Smith, W. J., Modern Optical Engineering, New York, McGraw-Hill, pp. 49–58, 1966), commonly referred to as the Seidel aberrations are: spherical, astigmatism, curvature of field, distortion, and coma. If white light is used in the imaging process then the additional effects of chromatic aberration also degrade image quality. Lens are generally designed to greatly minimized aberrations. The convolution effects can be minimized as well by using a confocal microscope. Unfortunately, a confocal microscope would cause photobleaching and photodamage to cells thereby limiting its widespread application, as is well known. Consequently, three-dimensional wide-field microscopy of the prior art relies on digital signal processing (DSP) techniques to deconvolve an image data and remove out-of-focus blurring.

Prior attempts to use deconvolution have been plagued by poor signal-to-noise (S/N) results. One of the suspected reasons for these poor results are less than ideal convergence to the optimum deconvolution transfer function and the inability to adequately suppress noise. Typically, a Wiener filter implemented in the frequency-domain is used, but Wiener filters are notorious for not adequately suppressing noise, see Agard, D. A., Hiraoka, Y., Shaw, P., Sedat, J. W., Methods in Cell Biology—Volume 30, Chapter 13 "Fluorescence Microscopy in Three Dimensions," San Diego, Calif., Academic Press, pp. 353–377, 1989 and Cherry, R. J., New Techniques of Optical Microscopy and Microspectroscopy, Boca Raton, Fla., CRC Press (Macmillan Press), pp. 31–43, 1991. One reason for this is that the noise characteristics must be known a priori and are assumed to be statistically stationary. Any non-stationarities present in the data have an adverse effect on the signal-to-noise ratio (S/N). The non-stationarities can be dealt with by using more sophisticated algorithms, e.g., Kalman filters do not assume stationarity and could be used to track changing statistics. Wiener filters are a special case of the Kalman filter where stationarity is assumed. However, the difference in computational intensity often precludes the use of Kalman filters. The three-dimensional microscope data sets exhibit stationary noise characteristics indicating the validity of Wiener filtering techniques for this problem.

SUMMARY OF THE INVENTION

The above-discussed and other drawbacks and deficiencies of the prior art are overcome or alleviated by the method and apparatus for three-dimensional deconvolution of optical microscope images of the present invention. In accordance with the present invention, a Wiener filter is used, but implemented with all the performance advantages associated with a one-dimensional adaptive time-domain solution, or, for the problem of three-dimensional microscopy, implemented in the three-dimensional spatial-domain. The adaptive structure is used only for converging to a solution. Once convergence has been achieved, the filter coefficients remain fixed for subsequent processing of image data sets. A key advantage of using the adaptive structure is its ability to optimally adapt to the noise characteristics. Convergence to an optimum solution for a deconvolution filter depends on the many factors. First, an image data selected to solve for the filter must contain a convolved event of a source object that is known a priori. Second, the image data must contain statistically representative noise. Third, a target or desired image data set must be derived that closely matches the a priori source. Finally, algorithm parameters must be selected to assure stability and achieve convergence to the minimum-mean-square-error (MMSE).

Many of the problems with previously attempted deconvolution filters are attributed to implementation in the frequency-domain. With Fourier transforms the signal is assumed to be periodic to the windowed data. Further, the discrete Fourier transform is bandwidth limited to the Nyquist frequency. Thus, adding frequency components that are no more than artifacts of the transforming process, or are missing frequencies because of aliasing and digital sampling errors.

In accordance with the present invention, an adaptive structure of a Wiener filter is used to deconvolve three-dimensional wide-field microscope images for the purposes of improving spatial resolution and removing out-of-focus light. The filter is a three-dimensional kernel representing a finite-impulse-response (FIR) structure requiring on the order of one thousand (1000) taps or more to achieve an acceptable mean-square-error. Converging to a solution is done in the spatial-domain and therefore does not experience many of the problems of frequency-domain solutions. Alternatively, a three-dimensional kernel representing an infinite-impulse-response (IIR) structure may be employed. An IIR structure typically requires fewer taps to achieve the same or better performance, resulting in higher resolution images with less noise and faster computations.

In its true adaptive form, the Wiener filter is configured to dynamically respond to remove periodic noise signals, e.g., such an adaptive Wiener filter is an echo-noise canceler such as commonly used in telephone systems. In accordance with such adaptive Wiener filters, the corresponding filter coefficients are altered adaptively in real-time based on the current data. However, with three-dimensional microscopy of the present invention a parametric solution is employed. In a parametric solution the corresponding filter coefficients are determined and then held as fixed parameters in the FIR structure. The use of a parametric solution has advantages over a Wiener filter implementation.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIGS. 9A–R show a series of central z-plane slices of the PSF corresponding to cell mitochondria of FIGS. 8A–L, with the PSF data shown in psf_byt.xxx, the synthesized desired data shown in desr_psf.xxx, and the filtered results shown in psf_ftr.xxx, where ".xxx indicating a corresponding plane identifier;

FIG. 13A is a plot of a typical frequency domain deconvolution with A designating raw data and B designating deconvolved data and FIG. 13B is a plot of a time-domain deconvolution deconvolution with C designating raw data and D designating deconvolved data. Note the high noise level and distortion in the frequency-domain solution compared to the time-domain solution.

DESCRIPTION OF THE PREFERRED EMBODIMENT

As described above, with three-dimensional wide-field microscopes deconvolution filtering is typically employed, which has distinct advantages over other filtering techniques for restoring resolution in three-dimensional data sets. One advantage is the ability to model the well understood convolution effects that gives rise to the PSF. Another advantage is that the other noise sources can be included in the deconvolution model. The filter acts to suppress the spatial-frequencies where noise signals dominate. In addition to eliminating or reducing the noise, deconvolution filters significantly improve resolution. The three-dimensional deconvolution filter is applied in a pseudo-one-dimensional process to a three-dimensional data set to concurrently remove the effects that deteriorate resolution. The deconvolution filter model performs well due to its formulation using Wiener statistics.

Figure 1:
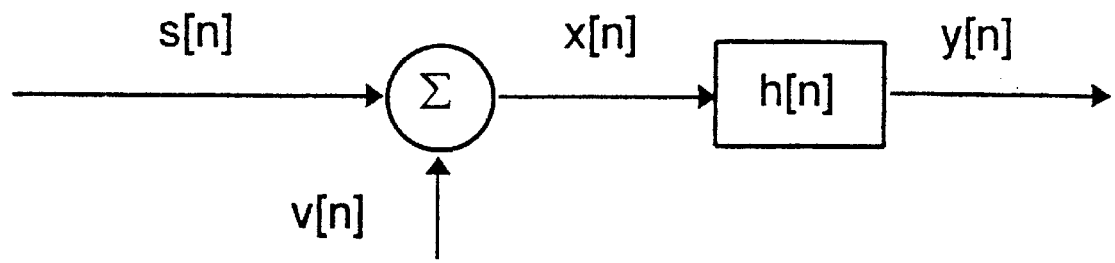
FIG. 1 is a diagrammatic model for linear estimation of discrete time sequences.

The three-dimensional filtering method is based on the statistics of Wiener filters where a signal of interest is estimated in the presence of noise. In this case, the noise is the blurring due to out-of-focus light, aberrations and convolution effects. It is assumed that the process is stochastic and the input data is wide-sense stationary. Referring to FIG. 1, a model for linear estimation of discrete time sequences is generally shown. The signal of interest s[n], is summed with noise v[n], and yields the input signal x[n]. The input signal x[n] is filtered by the sequence h[n] to provide an estimate of the signal y[n]. The input sequence x[n] is convolved with the filter sequence h[n] to produce the convolution sum y[n], which can be expressed as:

$$y[n] = \sum_{k=0}^{\infty} h[k]x[n-k], \quad (2)$$

see, Haykin, S., Modern Filters, New York, Macmillan, pp. 36–57, 77–104, 1989, which is incorporated herein by reference.

In some cases it is possible to define a desired sequence d[n] that corresponds to the signal of interest. An a priori sequence which represents the signal s[n] is desired from the filter. The difference between the desired sequence and the filter output is the error sequence, which can be expressed as:

$$e[n] = d[n] - y[n] \quad (3).$$

The Wiener filter is solved by statistically minimizing the error signal or residual e[n]. This can be accomplished by using a least-squares approach, wherein the mean-square-error (MSE) $\epsilon$ is defined as:

$$\epsilon = E\{e^2[n]\} \quad (4).$$

Where E{ } denotes the expected value. Applying equation (4) to equation (3) yields the following:

$$\epsilon = E\{d^2[n]\} - 2E\{d[n]y[n]\} + E\{y^2[n]\} \quad (5).$$

Rearranging terms of equation (5) results in the following equation:

$$\varepsilon = E\{d^2[n]\} - 2\sum_{k=0}^{\infty} h[k]E\{d[n]x[n-k]\} + \\ \sum_{k=0}^{\infty}\sum_{m=0}^{\infty} h[k]h[m]E\{x[n-m]x[n-k]\}. \quad (6)$$

It is assumed that x[n] and d[n] are wide-sense stationary. The quantity $E\{d^2[n]\}$ is the mean-square value of the desired signal and can be re-expressed as, $$r_d[0] = E\{d^2[n]\} \quad (7)$$

which leads to the definition of the cross-correlation function of the desired and input signals, $$r_{dx}[k] = E\{d[n]x[n-k]\} \quad (8).$$

Using the above cross-correlation function (equation (8)), the single summation in equation (6) can be expressed as:

$$\sum_{k=0}^{\infty} h[k]E\{d[n]x[n-k]\} = \sum_{k=0}^{\infty} h[k]r_{dx}[k]. \quad (9)$$

The quantity $E\{x[n-m]\,x[n-k]\}$ is the auto-correlation function of the input signal and can be expressed as:

$$r_x[k-m] = E\{x[n-m]x[n-k]\} \quad (10).$$

Using the above auto-correlation function (equation (10)), the double summation in the equation (6) can be expressed as:

$$\sum_{k=0}^{\infty}\sum_{m=0}^{\infty} h[k]h[m]E\{x[n-m]x[n-k]\} = \sum_{k=0}^{\infty}\sum_{m=0}^{\infty} h[k]h[m]r_x[k-m]. \quad (11)$$

Using the auto and cross-correlation functions (equations (8) and (10)), the mean-square-error can be expressed as:

$$\varepsilon = r_d[0] - 2\sum_{k=0}^{\infty} h[k]r_{dx}[k] + \sum_{k=0}^{\infty}\sum_{m=0}^{\infty} h[k]h[m]r_x[k-m]. \quad (12)$$

Equation (12) states that the error function is a quadratic equation (i.e., a 2nd order polynomial) for each of the h[n] terms. Therefore, the minimum-mean-square-error (MMSE) is the vertex of the quadratic equation for each of the values in the filter sequence (i.e., h[0], h[1], h[2], h[3], . . . ). The MMSE is obtained by taking the partial derivative of the error function with respect to each of the h[n] terms and setting it equal to zero. This is the least-mean-square (LMS) formulation to obtain the MMSE filter and can be expressed as:

$$\frac{\partial \varepsilon}{\partial h[k]} = -2r_{dx}[k] + 2\sum_{m=0} h[m]r_x[k-m] = 0 \quad (13)$$

or, $$r_{dx}[k] = \sum_{m=0}^{\infty} h[m]r_x[k-m] \quad (14)$$

The optimum solution for the filter is to have each of the individual h[n] values set to their respective minimum error. The multiple coefficients of the filter sequence h[n] define a linear system of equations known as the Wiener-Hopf equation, see, Haykin, S., Modern Filters, New York, Macmillan, pp. 36–57, 77–104, 1989, which is incorporated herein by reference. The minimum-mean-square-error occurs when all filter coefficients (i.e., impulse response coefficients), h[n]'s, are at their optimum value, h*[n]'s, which can be expressed as:

$$\varepsilon_{\min} = r_d[0] - \sum_{k=0}^{\infty} h^*[k]r_{dx}[k]. \quad (15)$$

Equation (15) is the starting point for a matrix solution to the Wiener-Hopf equation and is an exact solution for the MMSE filter. Since the data sequence and the filter length is finite, the equation (15) becomes:

$$\varepsilon_{\min} = r_d[0] - \sum_{k=0}^{M-1} h^*[k]r_{dx}[k], \quad (16)$$

where M equals the number of filter coefficients or taps. Thus, the Wiener-Hopf equation is a system of M equations and M unknowns. The unknowns are the optimum coefficient values which can be shown as a Mx1 vector, H*, sometimes called the optimum weight vector, W*, which can be expressed as:

$$\underline{H}^* = \begin{bmatrix} h^*[0] \\ h^*[1] \\ \vdots \\ h^*[M-2] \\ h^*[M-1] \end{bmatrix} = \underline{W}^* \quad (17)$$

There is also the Mx1 cross-correlation vector of the input and desired signals, which can be expressed as:

$$\underline{P} = \begin{bmatrix} r_{dx}[0] \\ r_{dx}[1] \\ \vdots \\ r_{dx}[M-2] \\ r_{dx}[M-1] \end{bmatrix} \quad (18)$$

where $r_{dx}[k]=E\{d[n]x[n-k]\}$ for k=0,1,2, . . . , M-1. To complete the matrix formulation, there is the M×M input correlation matrix of the mean-square values of the input data sequence x[n], x[n-1], x[n-2], . . . , x[n-M+2], x[n-M+1] and the correlations between them, which can be expressed as:

$$\underline{R} = \begin{bmatrix} r_x[0] & r_x[1] & \ldots & r_x[M-2] & r_x[M-1] \\ r_x[1] & r_x[0] & \ldots & r_x[M-3] & r_x[M-2] \\ \vdots & \vdots & \vdots & \vdots & \vdots \\ r_x[M-2] & r_x[M-3] & \ldots & r_x[0] & r_x[1] \\ r_x[M-1] & r_x[M-2] & \ldots & r_x[1] & r_x[0] \end{bmatrix} \quad (19)$$

where $r_x[k-m]=E\{x[n-m]x[n-k]\}$ for m, k=0, 1, 2, . . . , M-2, M-1. Although not obvious from the matrix above, $r_x[k-m]$ resides at the intersection of the $m^{th}$ row with the $k^{th}$ column. It should be evident that $r_x[k-m]=r_x[m-k]$ which allows the following matrix equation to be expressed as:

$$\underline{R}\,\underline{W}^* = \underline{P} \quad (20)$$

Thus, the exact solution to the Wiener-Hopf equation to obtain the MMSE optimum filter (see, Haykin, S., Modern Filters, New York, Macmillan, pp. 36–57, 77–104, 1989 and Widrow, B., Stearns, S. D., Adaptive Signal Processing, Englewood Cliffs, N.J., Prentice-Hall, pp. 99–137, 1985, which are incorporated herein by reference) is simply expressed as:

$$\underline{W}^* = \underline{R}^{-1}\underline{P} \quad (21).$$

While the foregoing appears to be rather simplistic, it is in fact quite difficult to solve for the inverse of a large matrix. For example, in the present example there are typically one thousand or more filter coefficients which would require solving for the inverse of a 1000×1000 matrix. The above formulation describes a one-dimensional Wiener filter is used in the present invention to solve for the three-dimensional deconvolution of microscope images. An adaptive structure is used to obtain the MMSE solution instead of the exact solution. The main advantage of this approach over the exact analytical solution is to avoid the difficulty of solving for the inverse of a very large matrix.

It is often desired to deconvolve a resulting response to recover an impulse input. The impulse resembles a Dirac-delta function and is used to obtain the impulse-response of the system. The impulse-response is a complete characterization of the system response and therefore defines the system transfer-function (TF). The transfer-function can be convolved with any input to yield the system response. Inevitably, the resulting response is a blurred output due to the effects of convolution. It will be appreciated that blurring is inherent to some degree in all imaging systems. A deconvolution filter operates to recover the impulse from the response by essentially inverting the transfer-function. The end result is to restore resolution (i.e., reverse the blurring) with a minimum of noise.

For example, consider an input signal, in the 1 D frequency-domain, to a system, X(ω), that resembles a Dirac-delta impulse function. The signal response $Y_1(\omega)$ from the system can be expressed as:

$$Y_1(\omega) = X(\omega)H(\omega) \quad (22).$$

where H(ω) is the transfer function or impulse response of the system, see Kino, Gordon S., Acoustic Waves: Devices, Imaging, and Analog Signal Processing, Englewood Cliffs, N.J., Prentice-Hall, pp.185–186,189–190, 482–495,1987, which is incorporated herein by reference. The input signal X(ω) is recovered, as it represents a distinct high-resolution event, whereby a filter with the transfer function $Y_2(\omega)$ is formulated to recover X(ω) and can be expressed as:

$$Y_2(\omega) = Y_1(\omega)/H(\omega) = X(\omega) \quad (23).$$

Figure 2:
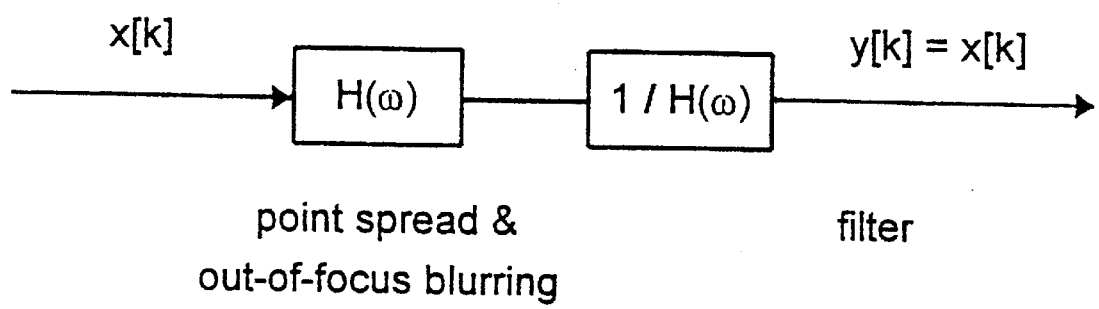
FIG. 2 is a diagrammatic model of the deconvolution filter.

The deconvolution filter is also called an inverse filter since it is modeled as the inverse transfer function of the system of FIG. 2. Unfortunately, the filter 1/H(ω) cannot be realized because it would need infinite values at the points where H((ω)=0. One solution to this problem is to measure the characteristic response H(ω) of the system. In the frequency range where H(ω) is finite, an inverse filter F(ω) can be defined as:

$$F(\omega) = \begin{bmatrix} 1/H(\omega) & \text{for} \quad \omega_1 < \omega < \omega_2 \quad \text{where} \quad H(\omega) \neq 0 \\ 0 & \text{else.} \end{bmatrix} \quad (24)$$

Alternatively, the response of the inverse filter may be modified using a Hamming, Kaiser or other window function to smooth the frequency response or smooth and limit the time response. In any case, some method must be used to address the region where $H(\omega)=0$. Otherwise, the noise output will vary as $1/H(\omega)$ and will be very large in the region where $H(\omega)$ approaches 0 ($1/H(\omega) \to \infty$).

Since a true deconvolution filter cannot be realized, an approximation is to use a Wiener filter. A Wiener filter provides the optimum or best fit solution in the statistical sense by minimizing an error function. Accordingly, the deconvolution model can be modified such that the output $Y(\omega)$ is a combination of an input signal's Fourier transform, $X(\omega)$, and noise spectrum, $N(\omega)$, and is filtered by the function with a response $W(\omega)$, which can be expressed as:

$$Y(\omega)=W(\omega)[X(\omega)+N(\omega)] \quad (25)$$

The error e(t) between the desired signal and the filtered output at each point in time is expressed as:

$$e(t)=d(t)-y(t) \quad (26)$$

or, in the frequency-domain as, $$E(\omega)=D(\omega)-Y(\omega) \quad (28).$$

The solution for the filter requires that the overall error $\epsilon$, in the time-domain (or spatial-domain) be minimized. The overall error is expressed as:

$$\varepsilon = \int_0^T \{e^2(t)\}dt \quad (29)$$

over the time duration T of the signal and, in the frequency-domain, is equivalent to requiring $\epsilon$ be minimized over the frequency range, where:

$$\epsilon = \frac{1}{2\pi} \int \{E^2(\omega)\}d\omega \quad (30)$$

where the brackets { } are used to denote the expected-value. Thus, the Wiener filter provides the minimum-mean-square-error (MMSE) solution to obtain the desired response. To complete the formulation of the Wiener filter in the frequency-domain, the magnitude of the error squared is stated:

$$|E^2(\omega)|=E(\omega)\cdot E^*(\omega)=[D(\omega)-Y(\omega)]\cdot[D^*(\omega)-Y^*(\omega)] \quad (31)$$

where * denotes the complex conjugate. Since it is assumed that x(t) and d(t) are uncorrelated with the noise: {ND*}, {NX*}, {XN*}, and {DN*}=0. Substituting these into equation (31), the mean of the square-error is:

$$\{|E^2(\omega)|\}=DD^*+WW^*\cdot[XX^*+\{NN^*\}]-DW^*X^*-D^*WX. \quad (32).$$

The condition for obtaining the MMSE is:

$$\frac{\partial}{\partial W^*}\{|E^2(\omega)|\} = \frac{\partial}{\partial W}\{|E^2(\omega)|\} \quad (33)$$
$$= W\cdot[XX^* + \{NN^*\}] - DX^* = 0.$$

The result is expressed as:

$$W(\omega) = \frac{D(\omega)\cdot X^*(\omega)}{X(\omega)\cdot X^*(\omega) + \{N(\omega)\cdot N^*(\omega)\}} \quad (34)$$

and defines the Wiener filter in the frequency-domain, see for example Kino, Gordon S., Acoustic Waves: Devices, Imaging, and Analog Signal Processing, Englewood Cliffs, N.J., Prentice-Hall, pp. 185–186, 189–190, 482–495,1987, which is incorporated herein by reference.

This filter has been typically solved in the frequency-domain by Fourier transform techniques. The solution is to set the taps of a delay-line transversal filter (FIR structure) that give the MMSE as defined above. However, there are problems associated with the frequency-domain solution. These problems are well documented. First, $N(\omega)$ must be known a priori. In many cases this is difficult since the noise is a combination of many sources and to varying degrees. Second, small changes in the noise level or distortion in the input signal have radical effects on the output. This relates to the assumption of stationarity that is required for Wiener filters. See, Karpur, P., Frock, B. G., Bhagat, P. K., "Wiener Filtering for Image Enhancement in Ultrasonic Nondestructive Evaluation," Materials Evaluation, Volume 48:Number 11, pp. 1374–1379, November 1990. Further, edge-effect is a problem where the edge of the image being processed is corrupted. This is due to the implicit assumption of periodicity of the image data and the point-spread-function (PSF) that must accompany a Fourier transform. A wrap-around occurs that is unavoidable and the Fourier transform adds unwanted frequency components for the wrap-around transition. Zero padding has been found to help, but there is still the risk of adding high frequency components. These unwanted frequency components contribute to a less-than-optimum solution to the Wiener filter. This problem is related to Gibbs phenomenon (see, Oppenheim, A. V., Shafer, R. W., Discrete-Time Signal Processing, Englewood Cliffs, N.J., Prentice-Hall, pp. 49–50, 444–446, 1989, which is incorporated herein by reference) where a Fourier transform has oscillatory behavior due to a discontinuity in the data. The Gibbs phenomenon is best understood by considering the theory of Fourier series. The oscillatory behavior occurs due to a non-uniform convergence to the data such as at a discontinuity. Since periodicity is assumed for all Fourier techniques, discontinuities typically occur at the wrap-around transition. Convergence of the Fourier series to the discontinuity would require an infinite number of coefficients. In a Fourier transform the bandwidth is fixed at the Nyquist frequency (i.e., ½ sampling frequency). The oscillatory behavior at the discontinuity is due to the Nyquist frequency limitation where the response at the discontinuity is the best that can be achieved. To minimize the effects of the Gibbs phenomenon, various windowing functions are used to attenuate and smooth the transitions at the wrap-arounds. For example, Bartlett, Hanning, Hamming and Blackman are some of the typically used window or apodizing functions. The windows can obviously alter the data which may have adverse effects or, at the very least, can contribute to un-wanted artifacts. Further, this could have the effect of making the filter overly sensitive to noise.

An additional problem associated with the frequency-domain solution to the Wiener filter is the introduction of ripples in the processed image. This is partially due to the assumptions regarding noise levels as described hereinbefore. There is no standard method for reliably estimating noise, which is primarily because the resulting filter has not converged optimally to the ideal deconvolution.

Disadvantages and complications of solving the Wiener filter in the frequency-domain are avoided by using a time-domain (or spatial-domain) solution in accordance with the present invention. In particular, a least-mean-square (LMS) solution to an adaptive linear combiner is investigated for three-dimensional deconvolution, using, for example, the so-called Widrow's adaptive linear combiner, see Widrow, B., Stearns, S. D., Adaptive Signal Processing, Englewood Cliffs. N.J., Prentice-Hall, pp. 99–137, 1985, which is incorporated herein by reference. This can be solved in the time-domain, since the performance surface is quadratic for each of the weights and the FIR structure assures stability.

In its true adaptive form, the filter continually adjusts its weights depending on the error signal as data is processed. For this application a parametric solution is chosen instead where the adaptive structure solves for the weights in a one-time process. The weights then become fixed values for the FIR filter.

The filter is designed to process three-dimensional image data sets using the one-dimensional formulation described herein. In the present example, the filter is applied to images of biological cells to accomplish two functions. First, it will deconvolve the image data with a considerable increase in spatial resolution. Second, it will also adapt to reduce the noise in the data including the contributions from out-of-focus light.

A two-dimensional deconvolution filter could be utilized to improve resolution and reduce noise. However, the filter would only be valid for a given plane and could not be applied to adjacent image planes. This would require a separate two-dimensional filter for each image plane in the three-dimensional data set. The level of performance achieved with a two-dimensional filter is likely less than that achieved with the three-dimensional filter.

The deconvolution process begins by using the impulse response of the imaging system. The impulse response is obtained by imaging a sub-resolvable fluorescent microsphere. The imaged micro-sphere, or point-spread-function (PSF), represents the degree of blurring every voxel in the image experiences. The next step is to determine a transfer function that, when convolved with the PSF response, results in a blur-free image of the micro-sphere. This transfer-function must also suppress noise. The transfer function in such case is a large FIR filter typically requiring one thousand or more taps to achieve acceptable results.

An efficient algorithm is needed to solve for the optimum values of the many filter coefficients. The LMS algorithm provides both efficiency and accuracy. Because of the statistical nature of the filter, it is referred to as an adaptive Wiener filter. The LMS algorithm has three characteristics that make it a practical choice:

1. solves for the several FIR coefficients that provide the best possible solution (achieves convergence to the MMSE);
2. converges to the optimum solution in a reasonable amount of time (~1 hour); and
3. remains stable during the adaptation.

A further requirement once the filter has completed its adaptation is to apply the coefficients (i.e., convolution with the three-dimensional image data set) in an acceptable amount of time. The adaptive LMS algorithm satisfies these requirements. Various features added to the implementation include: a synthesized desired image data set for adaptation; user selected variable number of taps in x, y and z (coefficients); and, an imbedded algorithm for stability and rapid convergence.

Figure 3:
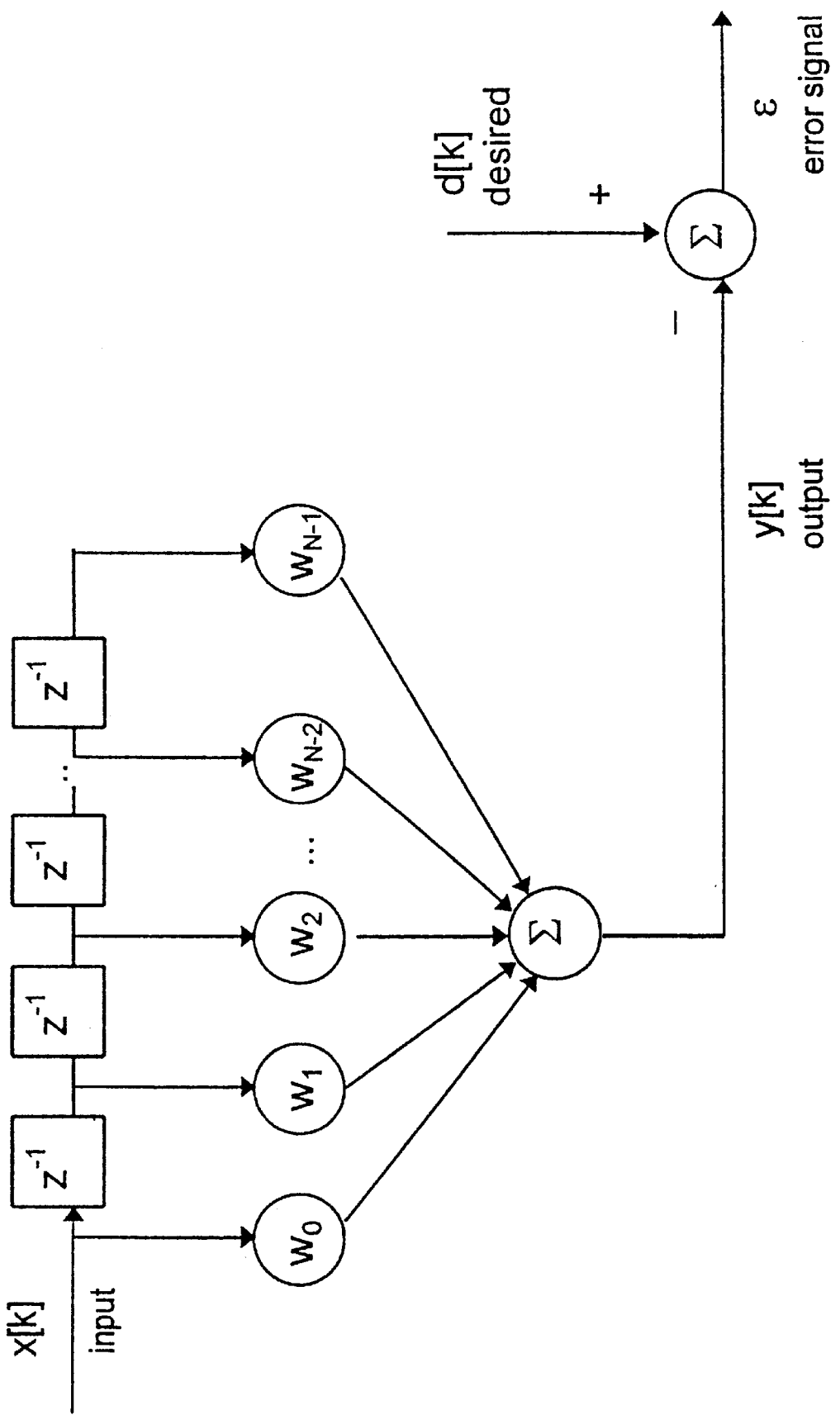
FIG. 3 is a diagrammatic model of a filter in the form of a tapped delay-line FIR structure.

Referring to FIG. 3, a filter is in the form of a tapped delay-line FIR structure is shown which provides an approximate, but realizable, de-blurred point-spread from the Wiener filter. The formulation of the filter is shown in one-dimension as a single input linear combiner (non-recursive transversal filter) to solve for the coefficients.

The optimum weight vector W*, is that which results in the least mean square error. There are several ways to solve for this optimum weight vector. The direct and exact solution is to generate the input correlation matrix R, along with the output cross-correlation vector P, of the desired signal and the input. The exact solution, described hereinbefore, results in the MMSE expressed as:

$$W^* = R^{-1} P \quad (35).$$

The input correlation matrix is defined by the following expression:

$$\underline{R} = \begin{bmatrix} r(0) & r(1) & \ldots & r(N-1) \\ r(1) & r(0) & \ldots & r(N-2) \\ \vdots & \vdots & \vdots & \vdots \\ r(n-1) & r(N-2) & \ldots & r(0) \end{bmatrix} \quad (36)$$

where N is the total number of taps for the N×N matrix, and $r(n, q) = E\{x(k-n) x(k-q)\}$ for n, q=0, 1, 2, ..., N-2, N-1. $E\{x(k-n) x(k-q)\}$ is the expected value and $r(n,q)$ is the $nq^{th}$ element (row n, column q) of the R matrix. The variable k is the index of the one-dimensional input data sequence where the data values through the unit delays are: x(k), x(k-1), x(k-2), etc.

The cross-correlation vector is defined as:

$$\underline{P} = \begin{bmatrix} p(0) \\ p(1) \\ \vdots \\ p(N-1) \end{bmatrix}$$

where $p(n) = E\{d(k) x(k-n)\}$ for n=0, 1, 2, ..., N-1. The variable n is the tap index and d(k) is the $k^{th}$ element of the desired data sequence corresponding to x(k) from the input data.

The equation, $W^* = R^{-1} P$, is the solution to the discrete-time Wiener-Hopf equation which determines the Wiener filter. Taking the inverse of the input correlation matrix is a difficult task considering the number of taps required for this filter. A 10×10×10 tap filter requires taking the inverse of a 1000×1000 matrix. An alternate method to solve for the optimum weight vector is to use an adaptive least-mean-square algorithm.

Figure 4:
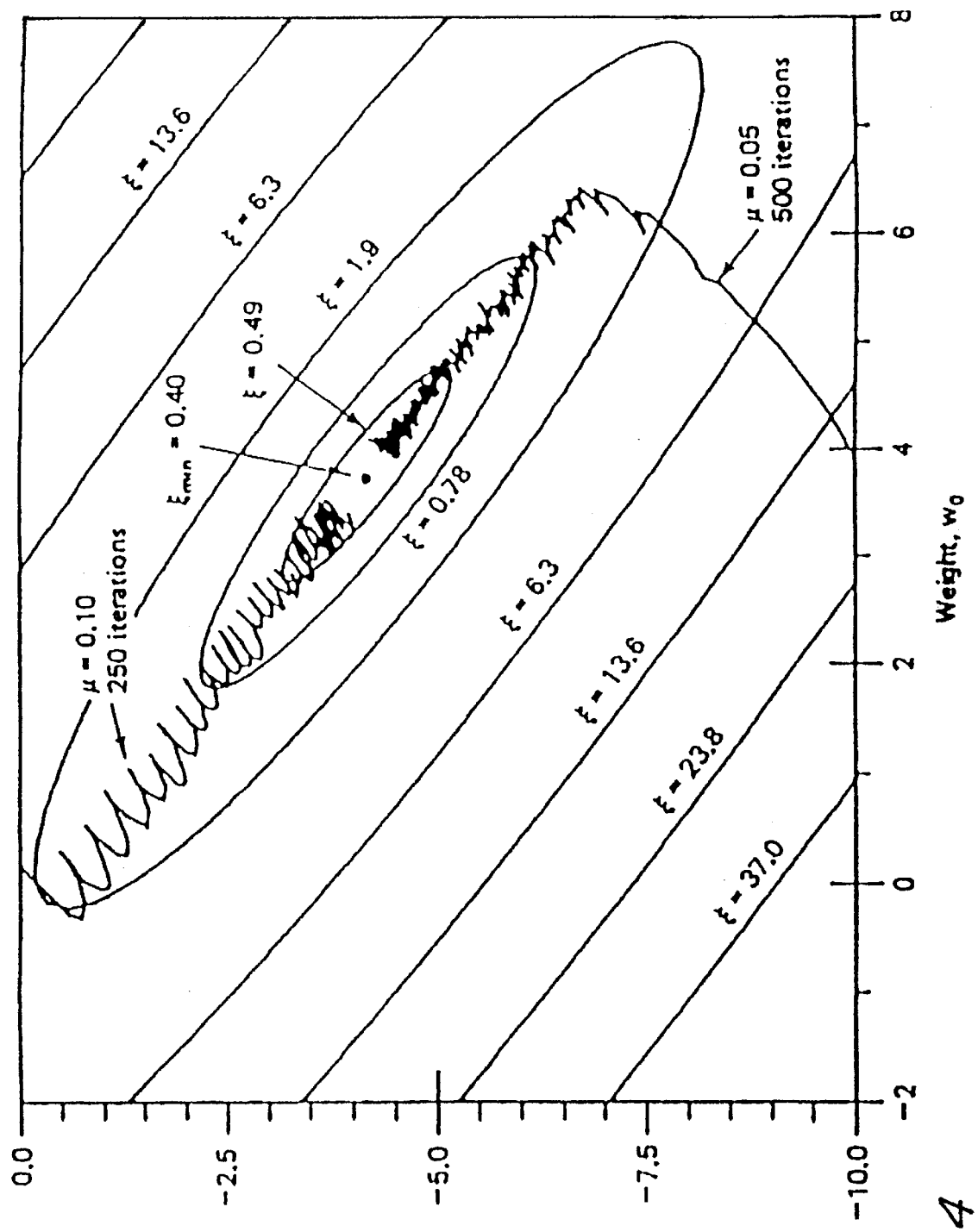
FIG. 4 is a plot of level curves of the performance surface showing the progress of the mean-square-error (MSE) as it is converging with each iteration to the minimum value (MMSE)

Referring to FIG. 4, the LMS solution converging numerically along a performance surface to an optimum solution is shown. This has many advantages over the exact solution, e.g., its simplicity and ease in programming and the pre-determining expected-values, such as those required for the input correlation matrix and cross-correlation vector, are not required. The performance surface is an N+1 dimensional surface (N=# taps) of the mean-square-error versus each of the weights. In all cases the error function is quadratic allowing a least-squares solution. The LMS algorithm in equation form is expressed as:

$$W_{k+1} = W_k + 2\mu \epsilon_k X_k \quad (38),$$

where $\epsilon_k = d[k] - X_k^T W_k$, and $X_k^T$ is the transpose of $X_k$. This iterative equation at the system level translates into the following equation for the individual weights:

$$W_{k+1} = W_k + 2\mu \epsilon_k \quad (39),$$

where k is a single variable used for the tap number, the iteration number and the input data point index. Since the iteration number will typically exceeds both the number of taps and data points, periodicity for $w_k$ (periodic in N) and $x_k$ (periodic in the number of input data points) is assumed.

The quantity $\mu$ is the convergence coefficient which determines the rate of convergence for the recursive equation and the minimum achievable mean-square error. Although the filter itself is non-recursive, the adaptation process is recursive and therefore stability is an issue. The convergence coefficient is determined based on the power of the input signal such that stability is assured.

The conditions for convergence while maintaining stability are outlined as follows:

$$0 < \mu < 1/\lambda_{max} \tag{40}$$

and $$k_{max} \leq [\text{tr } \Lambda] = \Sigma(\text{diagonal of } \Lambda) = \Sigma(\text{diagonal of } R) = \text{tr}[R] \tag{41}$$

where the maximum characteristic value (eigenvalue) of the R matrix is $\lambda_{max}$. $\Lambda$ defines the eigenvalue matrix of the $\lambda_n$ values. A slightly altered form of the input correlation matrix, R, illustrates the convergence conditions:

$$R = E \begin{bmatrix} x(0)x(0) & x(0)x(1) & \ldots & x(0)x(N-1) \\ x(1)x(0) & x(1)x(1) & \ldots & x(1)x(N-1) \\ \vdots & \vdots & & \vdots \\ x(N-1)x(0) & \ldots & & x(N-1)x(N-1) \end{bmatrix} \tag{42}$$

and $$tr[\underline{R}] = 1/N \sum_{i=0}^{N-1} x_j^2. \tag{43}$$

The term tr [R] is the trace of the R-matrix and defines the total signal power. This is the basis for determining a stable value for $\mu$.

The transition to applying these techniques to a multi-dimensional problem is now presented. It is assumed that the filter can adapt to all of the various noise sources. The rationale for assuming that the one-dimensional adaptive solution to the Wiener-Hopf equation is valid for a three-dimensional data set was arrived at based on the principle of separability. The separability property of convolution is best illustrated by its application to multi-dimensional Fourier transforms, see Gonzalez, R. C., Woods, R. E., *Digital Image Processing*, New York, Addison-Wesley, pp. 268–303, 1993, which is incorporated herein by reference. Taking the 3D Fourier transform of the function f(x,y,z) is defined as:

$$F(u, v, w) = \tag{44}$$

$$\int_{-\infty}^{+\infty} \int_{-\infty}^{+\infty} \int_{-\infty}^{+\infty} f(x, y, z) \exp[-j2\pi(ux + vy + wz)] dx\, dy\, dz,$$

where F(u,v,w) is the Fourier transform function with frequency variables u, v and w corresponding to the time or space variables x, y and z respectively. Applying the separability property yields:

$$F(u, v, w) = \tag{45}$$

$$\int_{-\infty}^{+\infty} \exp[-j2\pi(ux)]dx \int_{-\infty}^{+\infty} \exp[-j2\pi(vy)]dy \int_{-\infty}^{+\infty} f(x, y, z)\exp[-j2\pi(wz)]dz.$$

The separability property allows the Fourier transform to be applied in one, two or all three-dimensions. For example, taking the Fourier transform in the z-dimension only:

$$F(x, y, w) = \int_{-\infty}^{+\infty} f(x, y, z)\exp[-j2\pi(wz)]dz \tag{46}$$

and, the complete transform is then:

$$F(u, v, w) = \int_{-\infty}^{+\infty} \int_{-\infty}^{+\infty} F(x, y, w)\exp[-j2\pi(ux + vy)]dx\, dy. \tag{47}$$

The significance of this property as it applies to the three-dimensional microscope images is that the various contributions to blurring can be operated on separately by the filter. Since the convolution effects occur in the x-y planes only and the out-of-focus light occurs in the z direction, the filter must adapt to deal with each of these effects. The separability property states that the transfer-function of the three-dimensional filter in the x-y planes does not depend on z and the transfer-function in the z-direction does not depend on x and y. In concept, therefore, the filter should adapt to the various contributors to blurring without an interdependence between them. The filter performance to remove the PSF effects should not be impaired by the fact that it is also removing the out-of-focus light from adjacent z-planes. Furthermore, the one-dimensional adaptive process is used to optimize the convergence of the filter taking all of the effects of blurring and noise into account.

Specifically for this example, a three-dimensional microscope image data set with I×J×K voxels of value x[i,j,k] convolved with a filter having L×M×N elements (taps) each with a value w[l,m,n], will generate the output image data set, y[i,j,k]. In equation form, the output is generally defined as:

$$y[i, j, k] = \sum_{n=0}^{N-1} \sum_{m=0}^{M-1} \sum_{l=0}^{L-1} x[i, j, k]w[l, m, n]. \tag{48}$$

Adjusting the equation to correctly index the image data points, the summation becomes:

$$y[i, j, k] = \sum_{n=0}^{N-1} \sum_{m=0}^{M-1} \sum_{l=0}^{L-1} x[i-l, j-m, k-n]w[l, m, n], \tag{49}$$

evaluated for i,j,k=1, 2, 3, . . . , I,J,K. The look-back indexing (i−l,j−m,k−n) satisfies causality requirements for real-time systems. Since this is a post-processing algorithm, a look-forward indexing can be used in an equivalent manner:

$$y[i, j, k] = \sum_{n=0}^{N-1} \sum_{m=0}^{M-1} \sum_{l=0}^{L-1} x[i+l, j+m, k+n] w[l, m, n]. \quad (50)$$

For the convenience of being able to visualize a symmetrical filter kernel operating on the data, the following equivalent equation can also be used:

$$y[i, j, k] = \quad (51)$$
$$\sum_{n=0}^{N-1} \sum_{m=0}^{M-1} \sum_{l=0}^{L-1} x[i - L/2 + l, j - M/2 + m, k - N/2 + n] w[l, m, n],$$

The same iterative least-mean-square (LMS) process can be used in three-dimensions to determine the optimum filter that achieves convergence to the minimum-mean-square-error (MMSE). With a change of index variable from k to q, the resulting LMS equation is:

$$W_{q+1} = W_q + 2\mu \epsilon_q X \quad (52),$$

where q is the iteration number, $\mu$ is the convergence coefficient, and $$\epsilon_q = d[i,j,k] - X \star\star\star W_q \quad (53),$$

where $\epsilon_q$ is the error signal, d[i,j,k] is the desired voxel value, and $$\underline{X} \star\star\star \underline{W}_q = y_q[i, j, k] = \sum_{n=0}^{N-1} \sum_{m=0}^{M-1} \sum_{l=0}^{L-1} x[i-l, j-m, k-n] w_q[l, m, n]. \quad (54)$$

The triple star ★★★) notation signifies a three-dimensional convolution. The individual voxel iteration to optimize the weights is then:

$$W_{q+1}[l, m, n] = w_q[l, m, n] + 2\mu \left[ d[i, j, k] - \right. \quad (55)$$
$$\left. \sum_{n=0}^{N-1} \sum_{m=0}^{M-1} \sum_{l=0}^{L-1} x[i-l, j-m, k-n] w_q[l, m, n] \right]$$
$$x[i-l, j-m, k-n].$$

Making the same modification as above to have a symmetrical filter, the voxel iteration becomes:

$$w_{q+1}[l, m, n] = \quad (56)$$
$$w_q[l, m, n] + 2\mu \left[ d[i, j, k] - \sum_{n=0}^{N-1} \sum_{m=0}^{M-1} \sum_{l=0}^{L-1} x[i - L/2 + l, j - M/2 + m, \right.$$
$$\left. k - N/2 + n] w_q[l, m, n] \right]$$
$$x[i - L/2 - l, j - M/2 + m, k - N/2 + n].$$

The symmetrical filter is not only convenient for visualization purposes, but also assures a zero-phase filter. There is also no special process needed to initialize the W-matrix. The entire matrix is initialized to zero. The one parameter that does require initializing is the convergence coefficient $\mu$. The convergence coefficient is determined by the total signal power or, the trace of the R-matrix. In three-dimensions, the total signal power is:

$$tr[R] = \frac{1}{XYZ} \sum_{k=1}^{Z} \sum_{j=1}^{Y} \sum_{i=1}^{Z} (\text{data } [i, j, k])^2 \quad (57)$$

and $$0 < \mu < 1/\lambda_{max} \Rightarrow \mu < 1/tr[R] \quad (58)$$

or, rearranging terms, the convergence coefficient is:

$$\mu = \frac{NumPoints}{(\sum \sum \sum (\text{data } [i, j, k])^2)}. \quad (59)$$

Equation (59) assumes that in an adaptive system all or most of the data is non-zero. Even if the non-zero condition is not met, it is not a significant a problem in the one-dimensional case. But in two- and three-dimensions, zero-valued data is a major problem. As the sum of the square values in the denominator include more and more zero-valued terms, $\mu$ has a tendency to become excessively large resulting in in-stability. To compensate for this, the equation is modified to the following:

$$\mu = \frac{(.25) \; NumPoints}{NumTaps \; (\sum \sum \sum (\text{data } [i, j, k])^2)} \quad (60)$$

where (0.25) is an arbitrary scaling constant, NumPoints= XYZ, and NumTaps=LMN of the filter kernel (L=taps in X, M=taps in Y and N=taps in Z). It will be appreciated that the number of points in the data set (NumPoints) far exceeds the number of filter taps (NumTaps). Empirically, dividing $\mu$ by the number of taps (NumTaps) seems to assure that it remains small enough for stability to be maintained.

Figure 5:
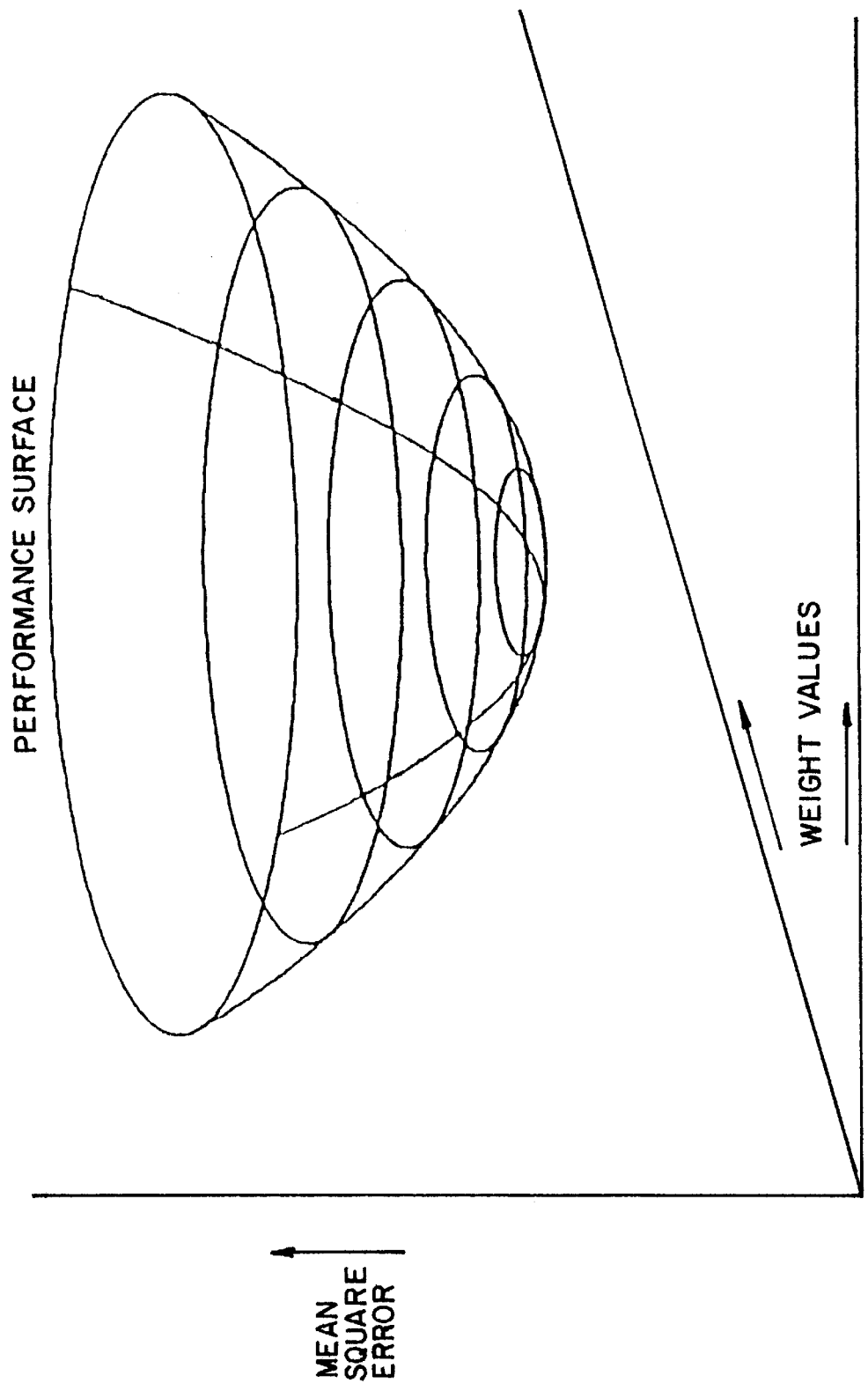
FIG. 5 is a plot of the performance surface showing the mean-square-error versus two weight values (2 tap FIR filter) where the error function for each weight is quadratic allowing a least-squares solution for the MMSE.

There are various schemes for accelerating the convergence. The basic issue is to start the iterations with large steps and reduce the step size as the iterations progress toward the minimum error. For example, $\mu$ could be reduced following each iteration with $\mu$=0.995 $\mu$. This results in a non-linear reduction of $\mu$ with the iteration number. In addition, as $\mu$ approaches zero, the MSE approaches the analytical or theoretical MMSE. Referring to FIG. 5 the progression of the MSE toward the MMSE with each iteration is shown. In this example, $\mu$ is held constant.

These equations require a desired image data set to solve for the filter. In this example, it is a synthesized data set of the sub-resolvable microsphere and is the a priori deconvolution of the PSF data set. The iterations are stopped once the weights have converged to the minimum-mean-square-error. This is usually determined empirically since the value of the minimum error is not known. The weights then become fixed values in the FIR filter. Subsequent image data sets can then be processed with the filter.

The above described three-dimensional filter has been derived from the one-dimensional equations and implemented in C programming language on a Silicon Graphics workstation (SGI), i.e., an Onyx workstation which has four R8000 64-bit RISC micro-processors operating at 75 Mhz and has 256 megabytes of RAM.

Experiments were conducted with various implementations of the three-dimensional LMS deconvolution filter on archived PSF functions. Filter performance was assessed subjectively by how well it converged to the desired PSF data set. Since the measure of performance was subjective, a means for universally testing the filter's performance with repeatable data was required. Devising a repeatable test method allows a quantitative comparison to other methods. The basis of universal or general testing of the algorithms was to use a phantom point spread generated by an easily reproducible function. The filter performance was then measured by tracking the overall mean-square-error for every iteration. The final phase of testing involved collecting real image data of a biological cell with companion PSF data. The PSF data was used to generate the filter which was then applied to (convolved with) the image data.

The image data was converted from a TIFF format (in which such image data are typically stored) to a format that could be easily read by a C program for subsequent processing, as is known. The data was then separated into individual x-y data sets for each of the z-planes that comprised the image. This facilitates displaying the data in two-dimensions.

Several different synthesized desired data sets were used for iterating the filters. The desired data basically consisted of a 3×3×3 cube with a single voxel of maximum intensity located in the center with the remaining eight voxels of the cube at half intensity. All other voxels were set to zero intensity. Among the variations to this general scheme for establishing the desired data set were to generate it mathematically using an exponential function, e.g., the desired PSF was set by the following expression: desired[x,y,z]= 65535 exp[$-r^2$], where $r^2$ is the radial distance squared away from the center. Increasing the exponent of r results in higher resolution of the restored image data.

Figure 6A:
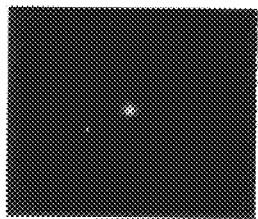
FIGS. 6A–AJ show a series of central z-plane slices of the PSF response to a micro-sphere.
Figure 6B:
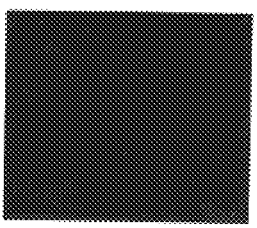
Figure 6C:
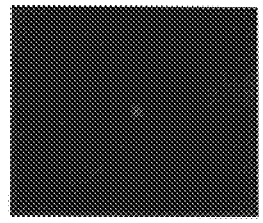
Figure 6D:
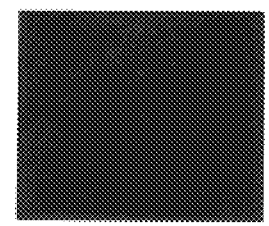
Figure 6E:
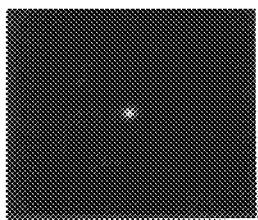
Figure 6F:
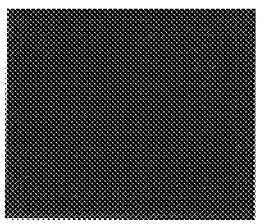
Figure 6G:
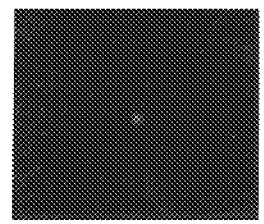
Figure 6H:
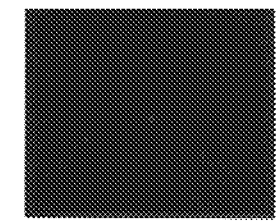
Figure 6I:
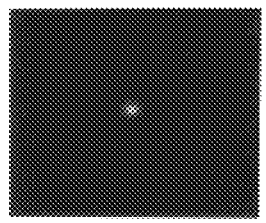
Figure 6J:
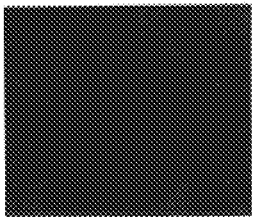
Figure 6K:
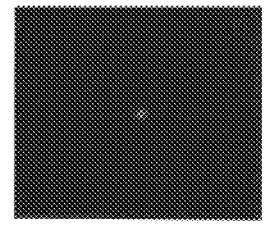
Figure 6L:
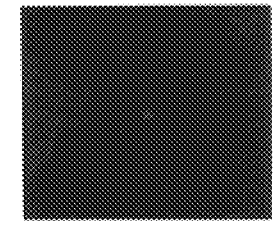
Figure 6M:
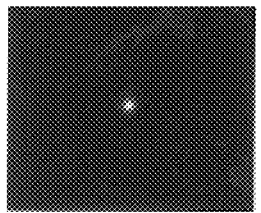
Figure 6N:
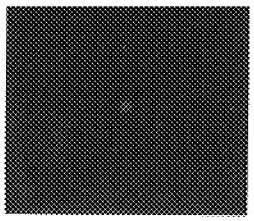
Figure 6O:
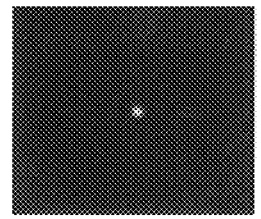
Figure 6P:
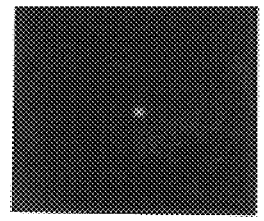
Figure 6Q:
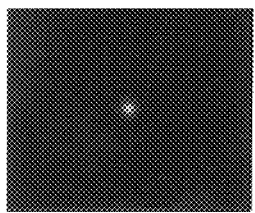
Figure 6R:
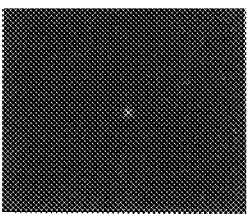
Figure 6S:
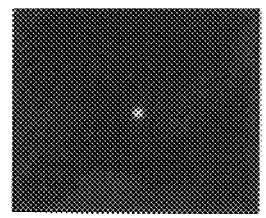
Figure 6T:
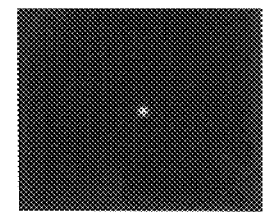
Figure 6U:
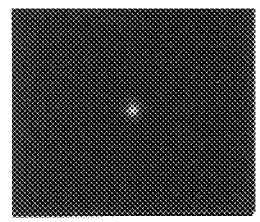
Figure 6V:
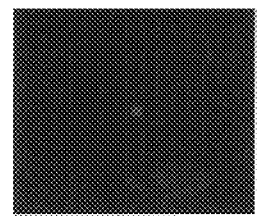
Figure 6W:
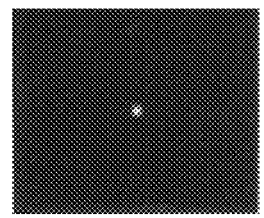
Figure 6X:
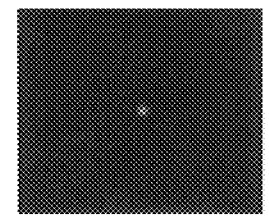
Figure 6Y:
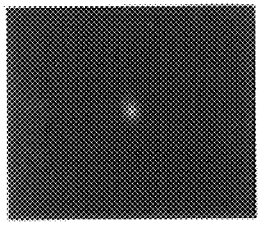
Figure 6Z:
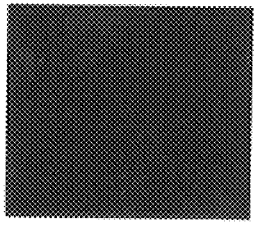
Figure 6A:
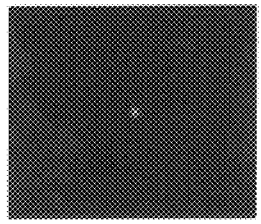
Figure 6A:
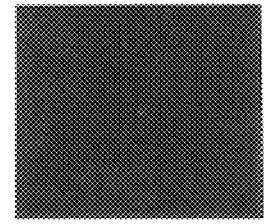
Figure 6A:
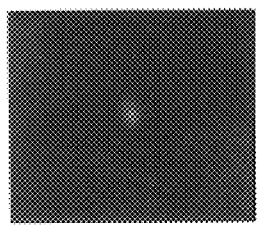
Figure 6A:
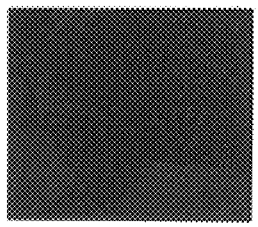
Figure 6A:
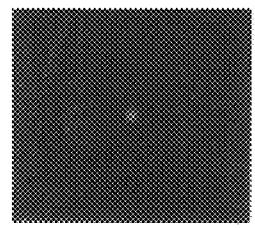
Figure 6A:
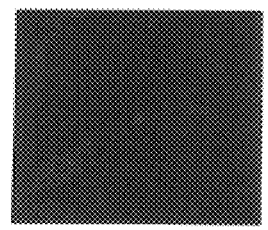
Figure 6A:
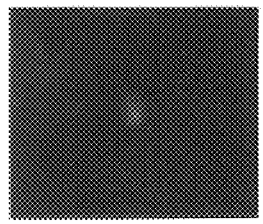
Figure 6A:
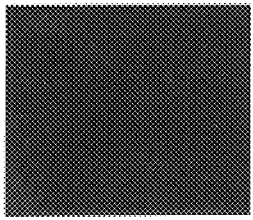
Figure 6A:
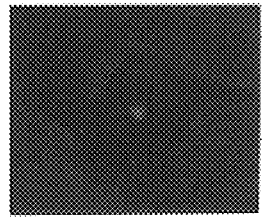
Figure 6A:
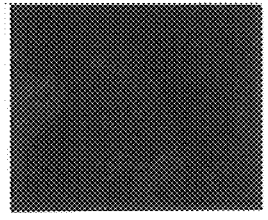

Once convergence of the filter was achieved, various parameters were experimented with to view the effects on stability, processing speed and performance. The parameters that were varied include: initializing and stepping of $\mu$; the number of filter taps in x, y and z; the number of iterations; and, varying the desired function. FIGS. 6A–AJ show a representative PSF and desired-PSF with some of the filtering results. More specifically, a series of central z-plane slices of the PSF response to a micro-sphere are shown. In actuality the point-spread occurs in x-y only with out-of-focus blur and other aberrations occurring in z. The PSF (les36psf.xxx) is 68×58×36 in x, y, and z respectively with a synthesized desired data set (desr36.xxx). Several different filters were experimented with. The results of two filters are shown here. The first one shown (ls36ftr2.xxx), is 21×21×9 taps in the filter kernel with 1200 iterations. The second filter results shown (ls36ftr4.xxx), is 21×21×21 taps with 1200 iterations. The ".xxx" indicates a corresponding plane identifier. It will be appreciated from these views that increasing the number of taps in z results in better performance in eliminating un-wanted light in the outer planes.

Figure 7Q:
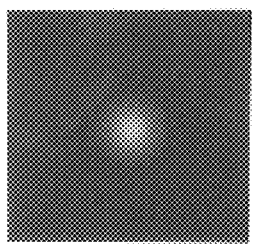
FIGS. 7A–AR show the even x-y planes for the general testing PSF @ $\sigma=0.1$ (exp_psf1.xxx) with the corresponding filtered plane (expsf_f1.xxx) and the PSF @ $\sigma=0.12$ is also shown (exp_psf2.xxx) with the corresponding filtered plane (expsf_f2.xxx), where ".xxx indicating a corresponding plane identifier.
Figure 7R:
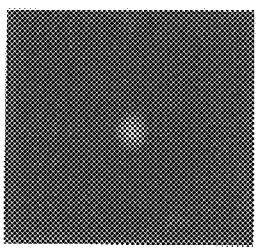
Figure 7S:
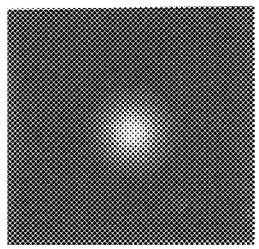
Figure 7T:
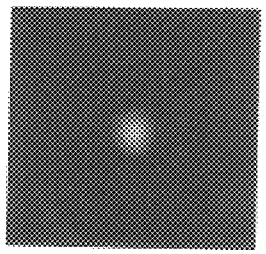
Figure 7U:
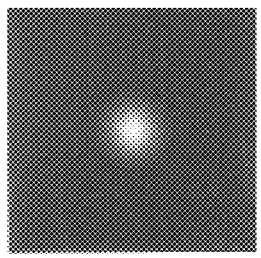
Figure 7V:
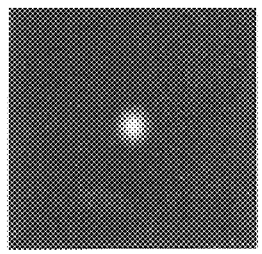
Figure 7W:
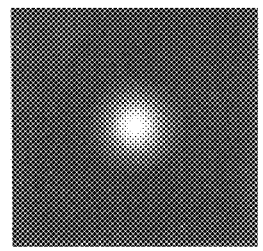
Figure 7X:
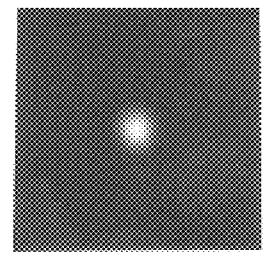
Figure 7Y:
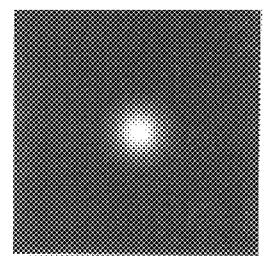
Figure 7Z:
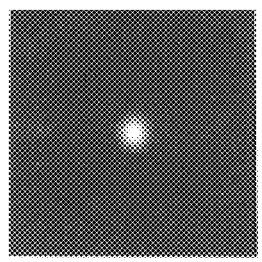
Figure 7A:
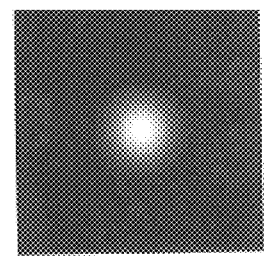
Figure 7A:
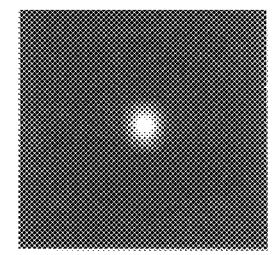
Figure 7A:
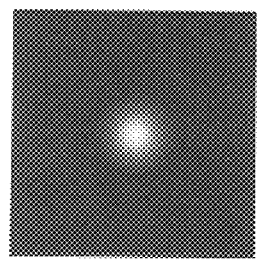
Figure 7A:
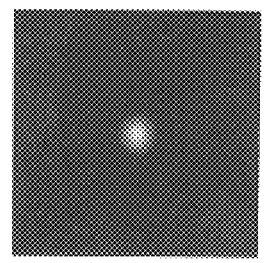
Figure 7A:
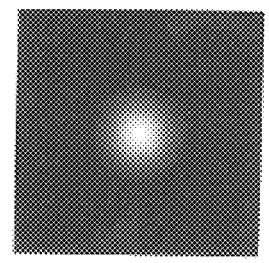
Figure 7A:
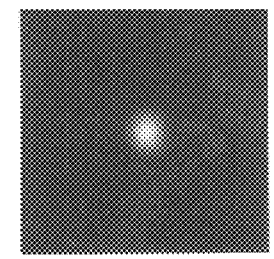
Figure 7A:
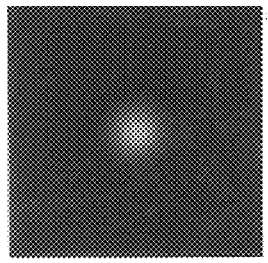
Figure 7A:
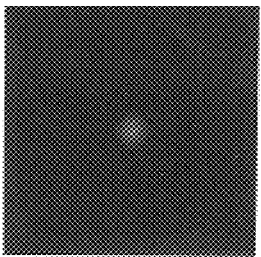
Figure 7A:
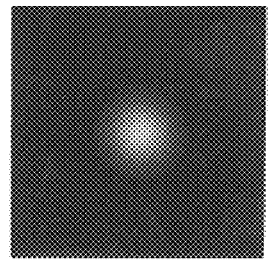
Figure 7A:
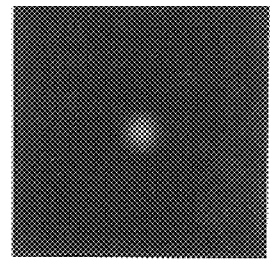
Figure 7A:
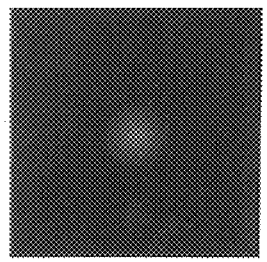
Figure 7A:
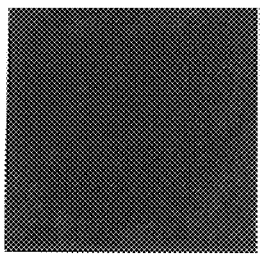
Figure 7A:
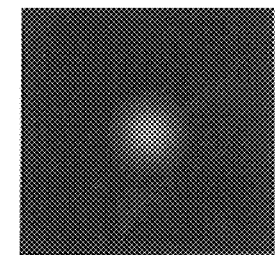
Figure 7A:
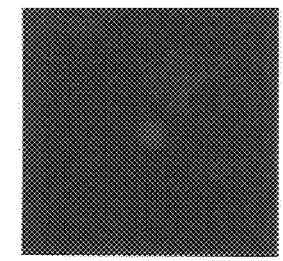
Figure 7A:
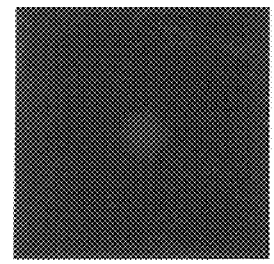
Figure 7A:
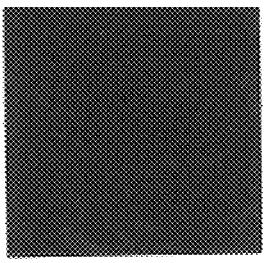
Figure 7A:
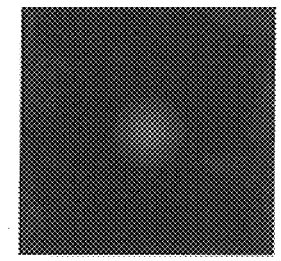
Figure 7A:
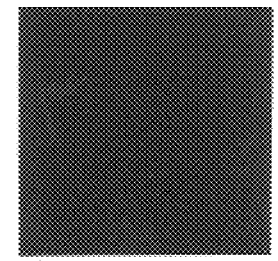
Figure 8A:
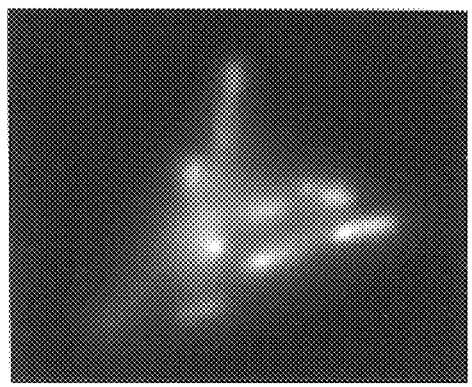
FIGS. 8A–L show a series of central z-plane slices from a 3-D data set of cell mitochondria, with the acquired cell data designated, cell_byt.xxx and the filtered results designated, cell_ftr.xxx, where ".xxx indicating a corresponding plane identifier.
Figure 8B:
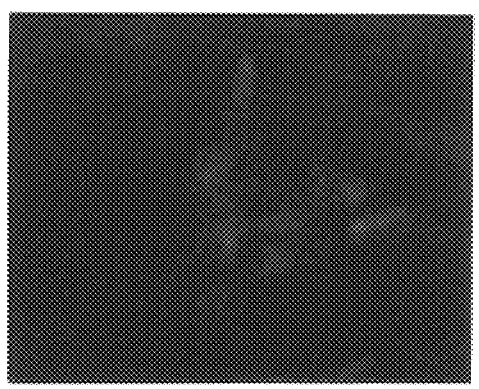
Figure 8C:
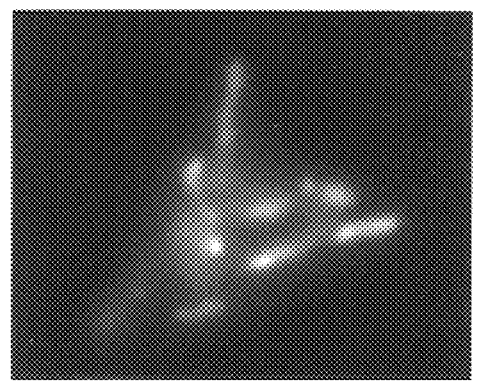
Figure 8D:
Figure 8E:
Figure 8F:
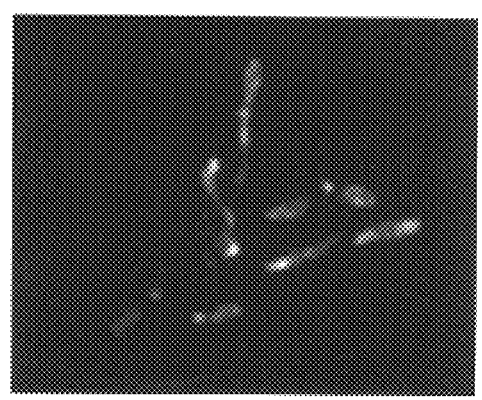
Figure 8G:
Figure 8H:
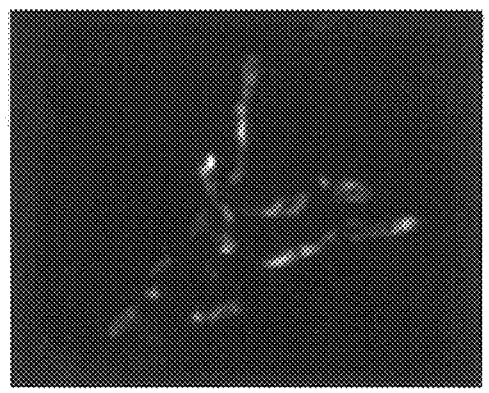
Figure 8I:
Figure 8J:
Figure 8K:
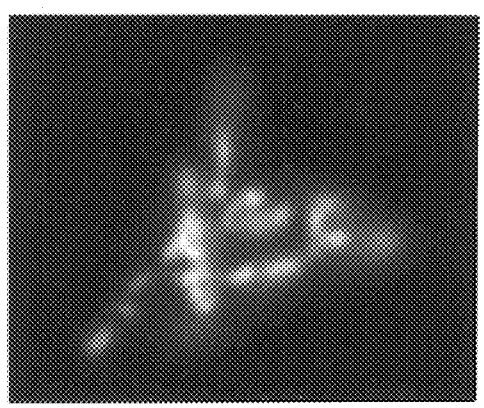
Figure 8L:
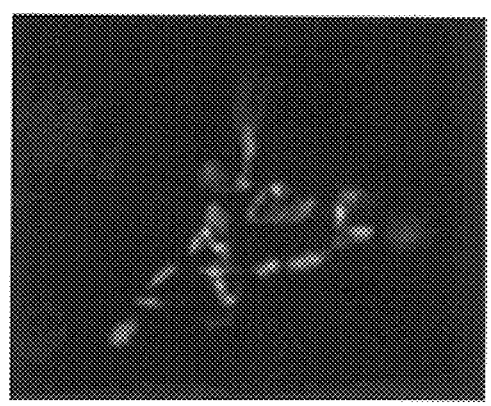

Testing was done by creating a blurred point-spread-function using the following equation:

$$f(x,y,z)=\exp(-(x^2+y^2+z^2)/\sigma^2) \text{ for } x,y,z \in [-0.5 \text{ to } +0.5] \quad (61)$$

where x,y,z is discretized into a 64×64×64 volume and $\sigma$ is the attenuation coefficient. Two test cases were run a first with $\sigma$=0.1 and a second with $\sigma$=0.5. After numerous attempts to make the deconvolution stable for the $\sigma$=0.5 case. it was clear that the attenuation was too gradual to maintain stability in the recursive iterations. Consequently, the second test case was changed to $\sigma$=0.12. FIGS. 7A–AR show the even x-y planes for the PSF @ $\sigma$=0.1 (exp_psf1.xxx) with the corresponding filtered plane (expsf_f1.xxx) and for the PSF @ $\sigma$=0.12 (exp_psf2.xxx) with the corresponding filtered plane (expsf_f2.xxx), where ".xxx" indicates a corresponding plane identifier. The MSE was calculated and stored to a file after each iteration as the filter was converging. The desired function for these test cases was a single voxel of maximum intensity corresponding to the center of the PSF. In this example, each iteration took approximately 4 minutes, 6 seconds. An iteration is defined as a complete pass through the 64×64×64 element data set. Technically, each filter tap is iterated for every point in the data set, or approximately 250,000 times for each complete pass. The test parameters could be modified for more rapid attenuation, which would be more representative of actual PSFs and compatible with the stability requirements for the iterative process. The C programs for deconvolving the data sets and the printouts of the convergence tracking are set forth hereinafter. The convergence tracking is show in the following order: iteration number, MAX value of filtered data, MIN value, and mean-square-error (MSE).

Figure 10A:
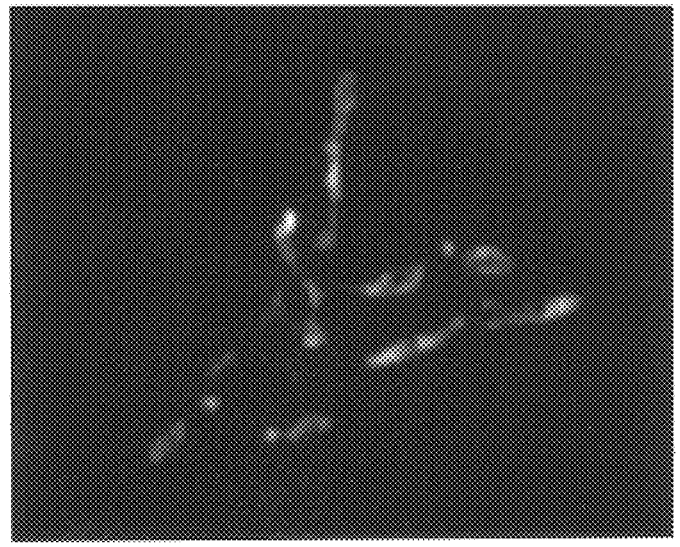
FIG. 10A shows a filtered x-y plane of cell mitochondria designated cell_ftr.024, with all resulting negative values are set to zero (equivalent to positive ½ wave rectification)
Figure 10B:
FIG. 10B shows a filtered x-y plane of cell mitochondria designated cell_str.024, which is identical to that of FIG. 10A except that it is displayed by setting the most negative value to zero intensity, or "stretched" over the full range of intensities.
Figure 11A:
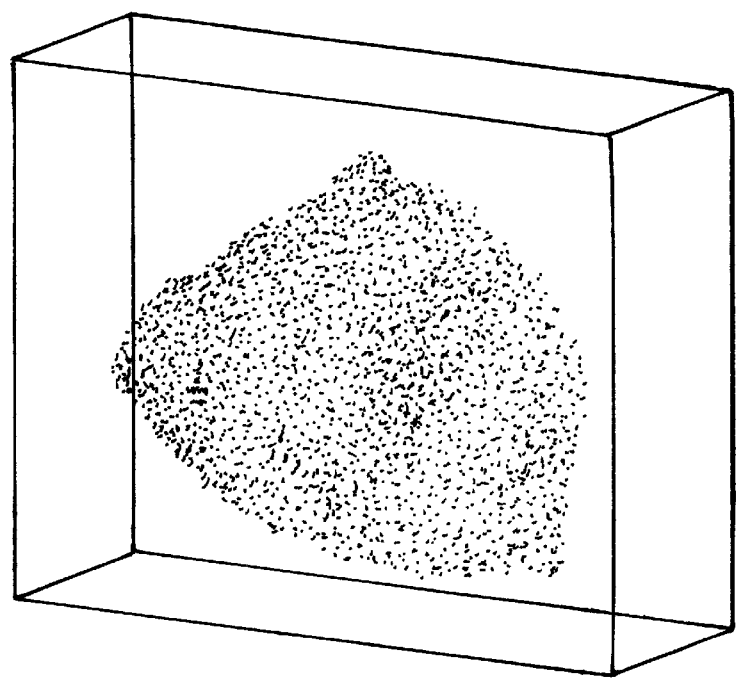
FIG. 11A is a volume rendering of the original image of the cell mitochondria data shown in FIGS. 8A–L.
Figure 11B:
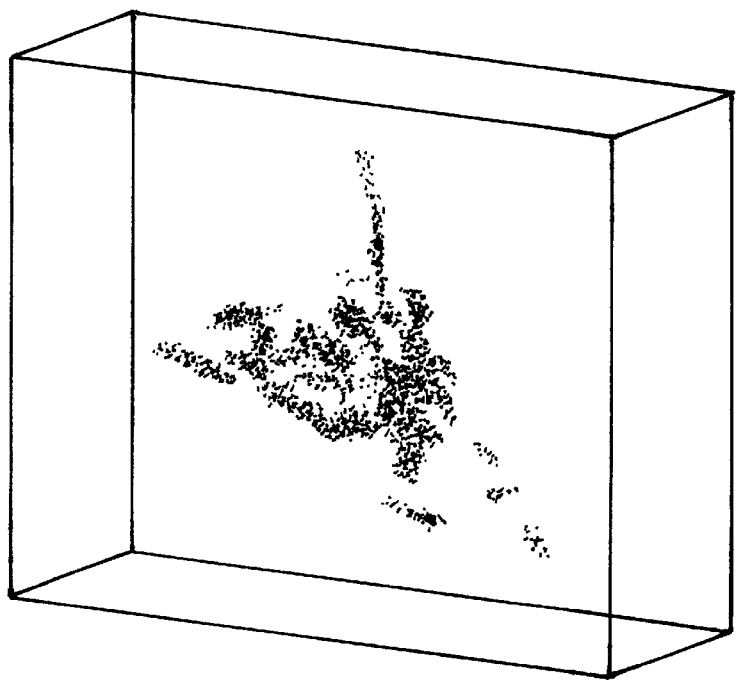
FIG. 11B is a volume rendering of the restored image of the cell mitochondria data shown in FIGS. 8A–L.
Figure 12A:
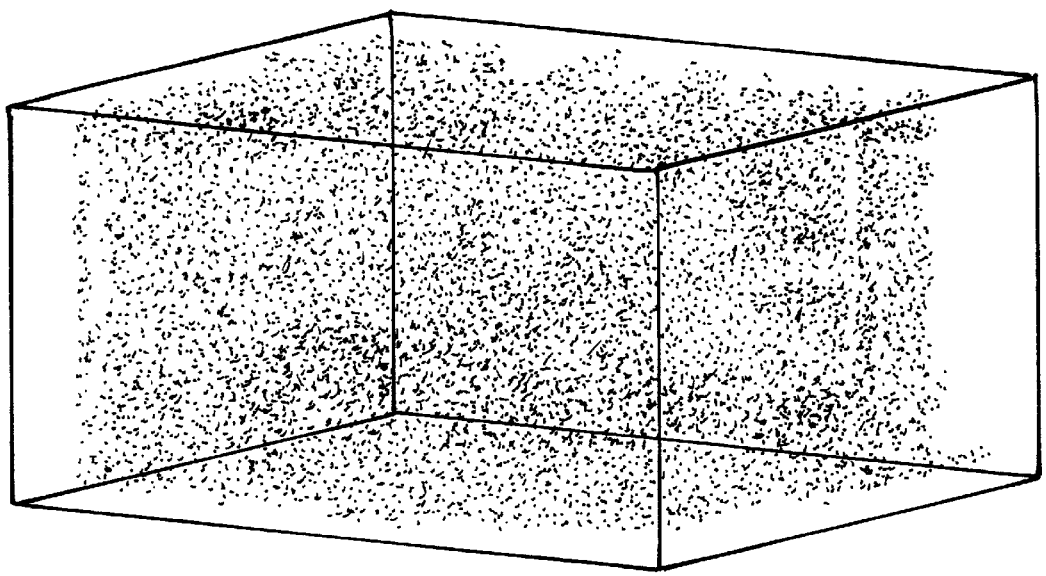
FIG. 12A is a volume rendering of the original image of the point spread function shown in FIGS. 9A–R.
Figure 12B:
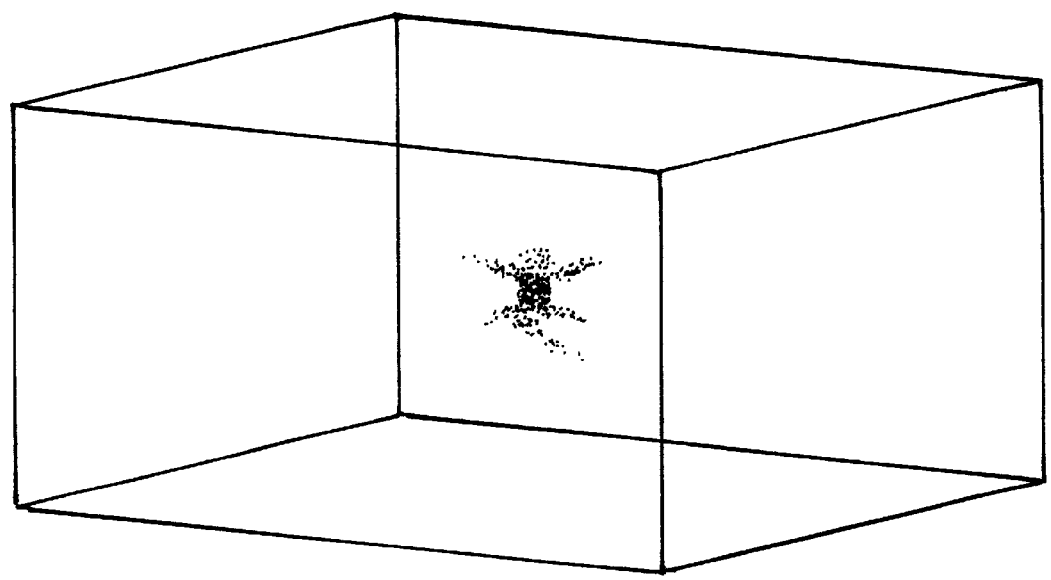
FIG. 12B is a volume rendering of the restored image of the point spread function shown in FIGS. 9A–R.

The data set is a three-dimensional series of cell mitochondria with a companion PSF. The PSF was generated from a 90 nm (0.09 $\mu$m) sub-resolvable fluorescent microbead. The voxel size is approximately 0.25 to 0.33 $\mu$m (0.25 $\mu$m nominal) in x, y and z. The numerical aperture of the lens is N.A.=1.4 @ $\eta$=1.52 with a 67° lens cone ½ angle. The data set size is 68×58×36 voxels. The data was filtered with an 11×11×11 kernel iterated to a desired PSF that was generated from an exponential function of $r^3$. FIGS. 8A–L, 9A–R and 10A–B show acquired image data of actual cell mitochondria with companion PSF data and the filtering results. FIGS. 8A–L show a series of central z-plane slices from a three-dimensional data set of cell mitochondria. The acquired cell data are designated, cell_byt.xxx and the filtered results are designated, cell_ftr.xxx, with ".xxx indicating a corresponding plane identifier. The filter is 11×11×11 (1331) coefficients applied to (convolved with) the image data set. FIGS. 9A–R show a series of central z-plane slices of the PSF corresponding to cell mitochondria of FIGS. 8A–L. The PSF data are shown in psf_byt.xxx, the synthesized desired data are shown in desr_psf.xxx, and the filtered results are shown in psf_ftr.xxx, where ".xxx indicating a corresponding plane identifier. The filter is 11×11×11 (1331) coefficients iterated 1200 times through the PSF data set. The results illustrate the high performance of this method with excellent convergence to the desired data set with extremely low noise. FIG. 10A shows a filtered x-y plane of cell mitochondria designated cell_ftr.024, with all resulting negative values are set to zero (equivalent to positive ½ wave rectification). FIG. 10B shows a filtered x-y plane of cell mitochondria designated cell_str.024, which is identical to that of FIG. 10A except that it is displayed by setting the most negative value to zero intensity, or "tstretched" over the full range of intensities. FIG. 11A is a volume rendering of the original image of the cell mitochondria data shown in FIGS. 8A–L and FIG. 11B is a volume rendering of the restored image of the cell mitochondria data shown in FIGS. 8A–L. FIG. 12A is a volume rendering of the point spread function shown in FIGS. 9A–R and FIG. 12B is a volume rendering of the restored image of the point spread function shown in FIGS. 9A–R. These volume renderings show the high level of un-wanted light prior to filtering.

Figure 13A:
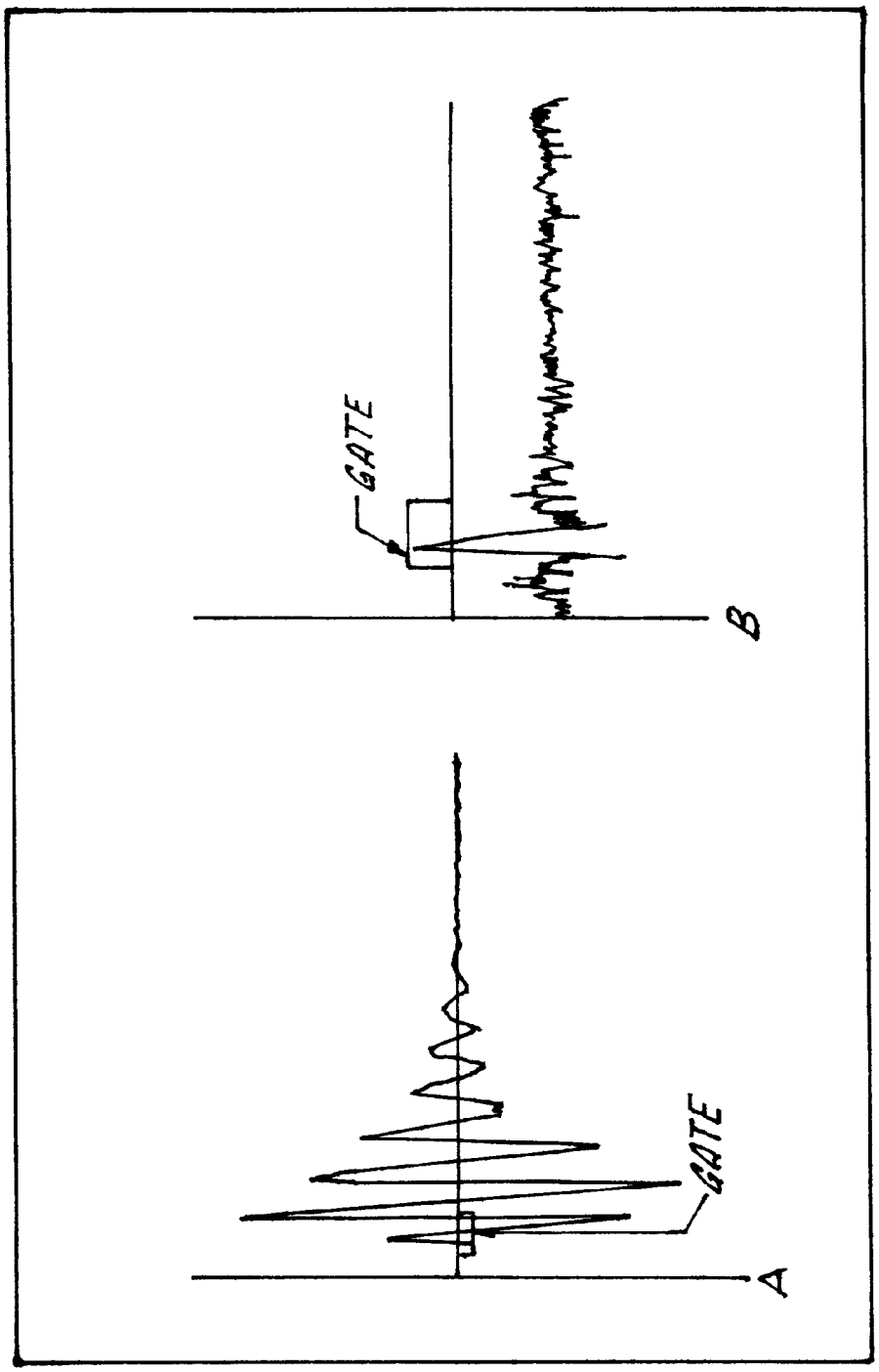
FIGS. 13A and B show a comparison of frequency-domain versus time-domain deconvolution of ultrasound data.
Figure 13B:
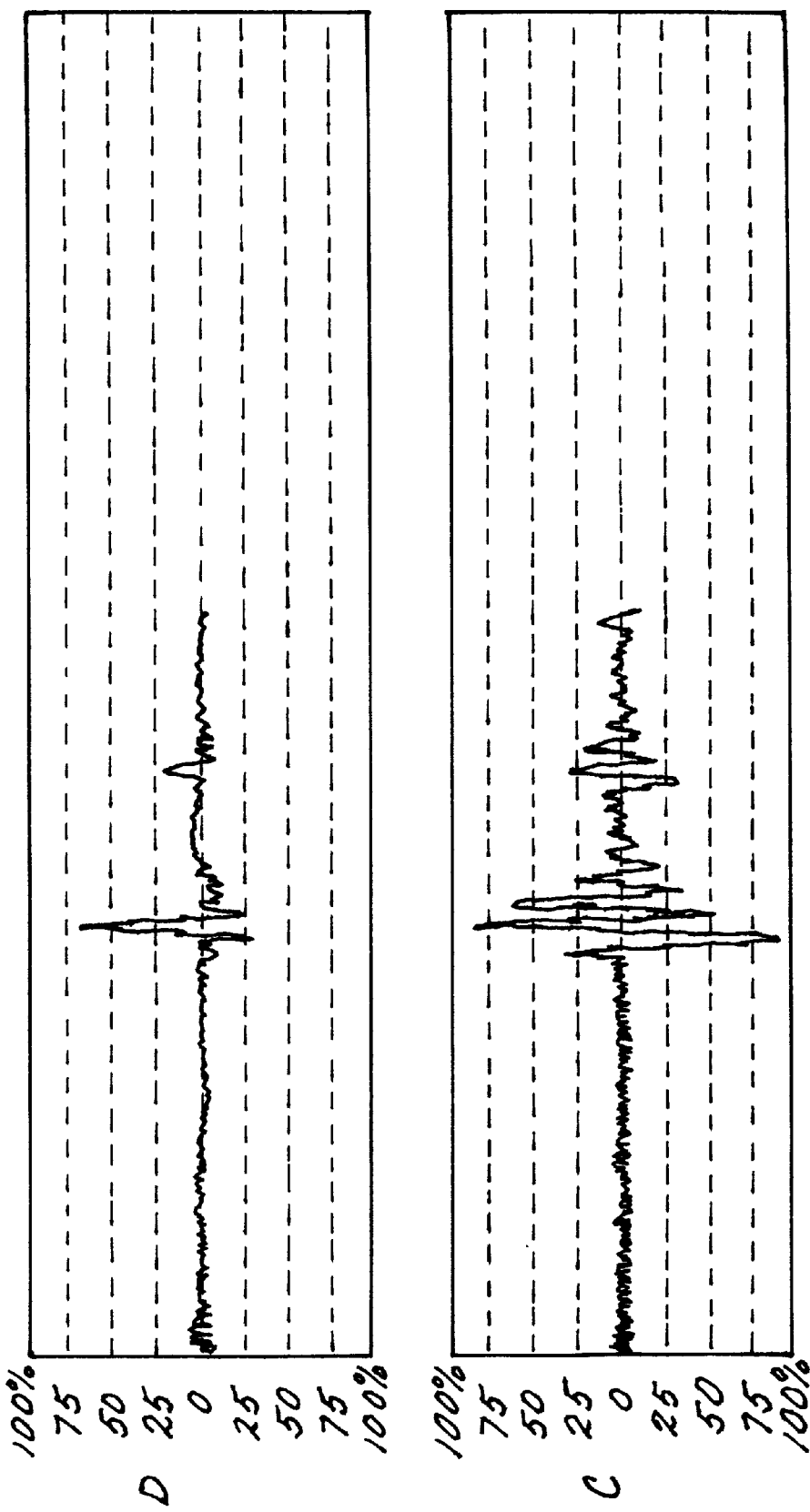

The results show excellent convergence in deconvolving the PSFs with no discernible noise. This could not be expected with a frequency-domain solution, an example of this is shown in FIGS. 13A and B. FIGS. 13A and B show a comparison of frequency-domain versus time-domain deconvolution of ultrasound data, FIG. 13A is a plot of a typical frequency domain deconvolution with A designating raw data and B designating deconvolved data and FIG. 13B is a plot of a time-domain deconvolution deconvolution with C designating raw data and D designating deconvolved data. In comparing frequency-domain to time-domain deconvolution of ultrasound data, there is considerably more distortion with higher noise levels associated with frequency-domain solutions. The biological results also show a dramatic improvement in resolution and noise reduction confirming the validity of the approach and the high performance that can be achieved. It also illustrates the theory of the PSF as completely characterizing the system's blurring and the stationary statistics associated with it.

One issue that warrants further discussion is the negative intensity values that result using linear filtering methods. The filtered images display negative values on the order of 12–20% of peak intensity values in the image. This occurs at the high-to-low intensity transitions. As discussed hereinbefore, it can be attributed to Gibbs phenomenon. The real issue is whether or not this has deleterious effects when there are strong features next to weakly fluorescing features. It should be pointed out, however, that there is no evidence of ripples, just a single negative excursion when transitioning from high to low intensity. FIGS. 10A and B show a filtered x-y plane of cell mitochondria where all resulting negative values are set to zero (FIG. 10A—cell_ftr.024) and where the most negative value is set to zero intensity, or stretched over the full range of intensities (FIG. 10B—cell_str.024), whereby the negative ripples are not a significant concern.

The method of the present invention is well suited for deconvolving optical microscope images and for medical imaging modalities such as radiography, MRI and ultrasound.

Important features of the method of the present invention for filtering three-dimensional data sets includes the use of an adaptive structure to solve for the filter and the use of a one-dimensional formulation for solving a three-dimensional filter. The method of the present invention significantly simplifies the solution of an inverse filter in multi-dimensional problems. The prior art filtering methods involve frequency-domain transformations and/or non-linear processes that either impair ultimate performance, slow the process or both.

There are many advantages of the present filtering method over the prior art filtering methods. The three-dimensional filter is solved using an adaptive structure for a one-dimensional adaptive LMS structure. The adaptive LMS solution has shown results that are superior to other solutions in one-dimension. The use of a synthesized "desired" data set as the a priori desired result from the filter. Prior deconvolution systems either do not use an a priori desired data set or it is not available as a measure of filter performance. A direct comparison to the a priori desired output avoids the formation of artifacts associated with frequency-domain solutions. The solution is entirely solved in the spatial-domain. The frequency-domain is typically used is due to the fact that convolution in the spatial-domain is equivalent to multiplication in the frequency-domain. A transfer-function (TF) is represented as a function of frequency with the inverse TF being simply 1/TF. This approach does not completely solve the problem since, as stated hereinbefore, the solution does not exist across the entire frequency spectrum (i.e., the inverse of zero's in the TF become unstable). The solutions have been made to work by making modifications to address the instabilities. Although the frequency-domain solution can be made to work, the quality of the results are impaired due to artifacts of the transformation process to and from the frequency domain. Some of the known artifacts due to frequency-domain transformations are: assumed periodicity in the data, aliasing, digitization error and Gibb's phenomenon. The adaptive LMS deconvolution filter results in low noise by adapting to suppress unwanted responses. Prior methods typically perform an adequate deconvolution but are adversely affected by noise. The present invention eliminates the need for smoothing or low-pass filtering and consequently can achieve the highest resolution possible. The filter implementation of the present invention has an automated means for determining $\mu$ (the convergence coefficient) that assures stability and accelerates convergence with better performance. The known relationship between the convergence criteria and the overall signal power is used to initialize $\mu$ such that stability is assured. Then $\mu$ is reduced non-linearly as a function of the iteration number. This process of reducing $\mu$ has two benefits: (1) accelerated convergence with (2) better performance. Further, it is believed that prior art systems do not use an algorithm for reducing the convergence coefficient. Instead, a stable value for its convergence coefficient is found and held constant during the iterative process. With the present invention the filter kernel size can be varied in x, y and z. Prior art methods typically use fixed-sized kernels. The ability to size the filter for optimum performance for both filter quality and time required for calculating the solution is an advantage over existing methods. Further, with the present invention once the filter is solved for a given setup, the filter can be applied to any image acquired with the same parameters. This allows the filter to be re-used thereby avoiding the large block of time required for generating a solution. The solution can be applied to any three-dimensional image data set that was collected with the same parameters such as voxel size in x, y and z and using the same glass cover slips. This is an advantage over existing methods since the solution can be applied quickly (a few minutes—the amount of time needed to convolve the filter with the data set).

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method of deconvolution filtering image data from an imaging system having a point spread function, the method comprising:

obtaining image data generated by the imaging system, the image data representing convolution of the point spread function of the imaging system and an image of a source object that is known a priori;

in the spatial-domain, filtering with an FIR filter said image data to provide filtered image data, said FIR filter having a plurality of coefficients;

in the spatial-domain, comparing a synthesized representation of said source object and said filtered image data to generate an error function;

adaptively adjusting said coefficients to determine a minimum of the error function;

ending said adjusting of said coefficients to provide fixed coefficients;

using said fixed coefficients to filter subsequent image data in a non-adaptive manner;

wherein said FIR filter deconvolves said image data;

said image data comprises three-dimensional image data and said FIR filter includes coefficients for each of said three dimensions; and said FIR filter is a one-dimensional statistical filter and said convolution is three dimensional.

2. The method of claim 1 wherein said minimum comprises a minimum mean-square-error.

3. The method of claim 2 further comprising:

applying a least-mean-square formulation to obtain said minimum mean-square-error.

4. The method of claim 3 wherein said error function is a quadratic and said minimum mean-square-error is a vertex of said quadratic.

5. The method of claim 1 wherein said source object is a sub-resolvable fluorescent micro-sphere.

6. The method of claim 1 wherein said imaging system is an optical microscope.

7. A method of deconvolution filtering image data from an imaging system having a point spread function, the method comprising:

obtaining image data generated by the imaging system, the image data representing convolution of the point spread function of the imaging system and an image of a source object that is known a priori;

in the spatial-domain, filtering with an FIR filter said image data to provide filtered image data, said FIR filter having a plurality of coefficients;

in the spatial-domain, comparing a synthesized representation of said source object and said filtered image data to generate an error function;

adaptively adjusting said coefficients to determine a minimum of the error function;

ending said adjusting of said coefficients to provide fixed coefficients;

using said fixed coefficients to filter subsequent image data in a non-adaptive manner;

wherein said FIR filter deconvolves said image data;

said image data comprises multi-dimensional image data and said FIR filter includes coefficients for each of said dimensions; and said FIR filter is a one-dimensional statistical filter and said convolution is multi-dimensional.

8. An apparatus for deconvolution filtering image data from an imaging system having a point spread function, the image data representing convolution of the point spread function of the imaging system and an image of a source object that is known a priori, the apparatus comprising:

an FIR filter for obtaining image data generated by the imaging system and in the spatial-domain, filtering said image data to provide filtered image data, said FIR filter having a plurality of coefficients;

a comparator for comparing, in the spatial-domain, a synthesized representation of said source object and said filtered image data to generate an error function;

said FIR filter adaptively adjusting said coefficients to determine a minimum of the error function;

said FIR filter ending said adjusting of said coefficients to provide fixed coefficients;

said FIR filter using said fixed coefficients to filter subsequent image data in a non-adaptive manner;

wherein said FIR filter deconvolves said image data;

said image data comprises three dimensional image data and said FIR filter includes coefficients for each of said dimensions; and said FIR filter is a one-dimensional statistical filter and said convolution is three dimensional.

9. The apparatus of claim 8 wherein said minimum comprises a minimum mean-square-error.

10. The apparatus of claim 9 further comprising:

applying a least-mean-square formulation to obtain said minimum mean-square-error.

11. The apparatus of claim 9 wherein said error function is a quadratic and said minimum-mean-square-error is a vertex of said quadratic.

12. The apparatus of claim 8 wherein said source object is a sub-resolvable fluorescent micro-sphere.

13. The apparatus of claim 8 wherein said imaging system is an optical microscope.

14. An apparatus for deconvolution filtering image data from an imaging system having a point spread function, the image data representing convolution of the point spread function of the imaging system and an image of a source object that is known a priori, the apparatus comprising:

an FIR filter for obtaining image data generated by the imaging system and in the spatial-domain, filtering said image data to provide filtered image data, said FIR filter having a plurality of coefficients;

a comparator for comparing, in the spatial-domain, a synthesized representation of said source object and said filtered image data to generate an error function;

said FIR filter adaptively adjusting said coefficients to determine a minimum of the error function;

said FIR filter ending said adjusting of said coefficients to provide fixed coefficients;

said FIR filter using said fixed coefficients to filter subsequent image data in a non-adaptive manner;

wherein said FIR filter deconvolves said image data;

said image data comprises multi-dimensional image data and said FIR filter includes coefficients for each of said dimensions; and said FIR filter is a one-dimensional statistical filter and said convolution is multi-dimensional.

* * * * *

UNITED STATES PATENT AND TRADEMARK OFFICE
CERTIFICATE OF CORRECTION

PATENT NO. : 6,166,853
DATED : December 26, 2000
INVENTOR(S) : Sapia et al.

It is certified that error appears in the above-identified patent and that said Letters Patent is hereby corrected as shown below:

Column 8,
Line 55, delete " $\frac{\partial \varepsilon}{\partial h[k]} = -2 r_{dx}[k] + 2 \sum_{m=0} h[m] r_x[k-m] = 0 \quad (13)$ " and insert therefor -- $\frac{\partial \varepsilon}{\partial h[k]} = -2 r_{dx}[k] + 2 \sum_{m=0}^{\infty} h[m] r_x[k-m] = 0 \quad (13)$ --

Column 15,
Line 13, after "and" delete "k max" and insert therefor -- $\lambda$max --

Column 17,
Line 36, after "star" insert therefor -- ( --

Column 18,
Line 5, delete " $tr[R] = \frac{1}{XYZ} \sum_{i=1}^{Z} \sum_{j=1}^{Y} \sum_{k=1}^{Z} (data\ [i, j, k])^2 \quad (57)$ " and insert therefor -- $tr[R] = \frac{1}{XYZ} \sum_{k=1}^{Z} \sum_{j=1}^{Y} \sum_{i=1}^{X} (data\ [i, j, k])^2 \quad (57)$ --

Column 20,
Line 49, before "over", delete "tstretched" and insert therefor -- stretched --

Signed and Sealed this

Fourteenth Day of September, 2004

JON W. DUDAS
*Director of the United States Patent and Trademark Office*